United States Patent
Lamas et al.

(10) Patent No.: US 10,185,740 B2
(45) Date of Patent: Jan. 22, 2019

(54) EVENT SELECTOR TO GENERATE ALTERNATE VIEWS

(71) Applicant: SPLUNK, INC., San Francisco, CA (US)

(72) Inventors: Divanny I. Lamas, San Francisco, CA (US); Marc Vincent Robichaud, San Francisco, CA (US); Carl Sterling Yestrau, San Francisco, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 15/011,284

(22) Filed: Jan. 29, 2016

(65) Prior Publication Data
US 2016/0147829 A1    May 26, 2016

Related U.S. Application Data

(63) Continuation of application No. 14/528,939, filed on Oct. 30, 2014.
(Continued)

(51) Int. Cl.
| | |
|---|---|
| G06F 17/30 | (2006.01) |
| G06F 3/0482 | (2013.01) |
| G06F 3/0481 | (2013.01) |
| G06F 3/0484 | (2013.01) |
| H04L 12/24 | (2006.01) |
| G06F 11/07 | (2006.01) |

(52) U.S. Cl.
CPC ...... *G06F 17/30398* (2013.01); *G06F 3/0482* (2013.01); *G06F 3/04817* (2013.01); *G06F 3/04847* (2013.01); *G06F 17/30554* (2013.01); *G06F 11/0766* (2013.01); *G06F 2203/04803* (2013.01); *H04L 41/22* (2013.01)

(58) Field of Classification Search
None
See application file for complete search history.

(56) References Cited

U.S. PATENT DOCUMENTS 5,226,118 A * 7/1993 Baker ................ G05B 23/0232
345/440
5,251,152 A    10/1993 Notess
(Continued)

OTHER PUBLICATIONS

Bing search q=display%20query%20system%20event%2 Apr. 4, 2016.*
(Continued)

*Primary Examiner* — Jeffrey A Gaffin
*Assistant Examiner* — John M Heffington
(74) *Attorney, Agent, or Firm* — Shook, Hardy & Bacon, L.L.P.

(57) ABSTRACT

An event view selector for a search user interface is described. In one or more implementations, a service may operate to collect and store data as events and apply a late binding schema to extract events that match the search criteria and provide search results for display via the search user interface. The search user interface exposes an event view selector operable to enable transitions between multiple different views of the events associated with different levels of detail. The views may include at least a raw view, a list view, and a table view. Responsive to receiving an indication of a view selected via the event view selector, the selected view may be exposed via the search user interface.

30 Claims, 25 Drawing Sheets

Related U.S. Application Data

(60) Provisional application No. 62/058,069, filed on Sep. 30, 2014.

(56) References Cited

U.S. PATENT DOCUMENTS

| | | | |
|---|---|---|---|
| 5,261,044 A | 11/1993 | Dev et al. | |
| 5,619,688 A | 4/1997 | Bosworth et al. | |
| 5,625,812 A | 4/1997 | David | |
| 5,760,770 A | 6/1998 | Bliss et al. | |
| 5,787,411 A | 7/1998 | Groff et al. | |
| 5,966,712 A | 10/1999 | Sabatini et al. | |
| 5,982,370 A | 11/1999 | Kamper | |
| 6,072,493 A | 6/2000 | Driskell et al. | |
| 6,301,584 B1 | 10/2001 | Ranger | |
| 6,430,584 B1 | 8/2002 | Comer et al. | |
| 6,438,565 B1 | 8/2002 | Ammirato et al. | |
| 6,493,703 B1 | 12/2002 | Knight et al. | |
| 6,513,033 B1* | 1/2003 | Trauring | G06F 17/30737 |
| 6,553,317 B1 | 4/2003 | Lincoln et al. | |
| 6,691,254 B2* | 2/2004 | Kaler | G06F 11/302 |
| | | | 714/39 |
| 6,768,997 B2 | 7/2004 | Schirmer et al. | |
| 6,775,682 B1 | 8/2004 | Ballamkonda et al. | |
| 6,851,088 B1 | 2/2005 | Conner et al. | |
| 7,034,710 B2* | 4/2006 | Falada | G05B 23/0272 |
| | | | 340/539.24 |
| 7,131,037 B1* | 10/2006 | LeFaive | H04L 41/0631 |
| | | | 714/46 |
| 7,173,651 B1 | 2/2007 | Knowles | |
| 7,190,382 B1 | 3/2007 | Retlich et al. | |
| 7,324,108 B2* | 1/2008 | Hild | H04L 41/22 |
| | | | 345/440 |
| 7,480,647 B1 | 1/2009 | Murstein et al. | |
| 7,583,187 B1* | 9/2009 | Cheng | G06F 21/552 |
| | | | 340/3.1 |
| 7,669,119 B1 | 2/2010 | Orelind et al. | |
| 7,703,026 B2 | 4/2010 | Bechtold et al. | |
| 7,750,910 B2* | 7/2010 | Hild | H04L 41/22 |
| | | | 345/440 |
| 7,822,707 B1 | 10/2010 | Yehuda et al. | |
| 7,925,660 B2* | 4/2011 | Dieberger | G06F 11/324 |
| | | | 707/757 |
| 8,140,563 B2 | 3/2012 | Midgley | |
| 8,150,815 B2* | 4/2012 | Vian | G07C 5/085 |
| | | | 701/19 |
| 8,150,960 B2 | 4/2012 | Kumbalimutt | |
| 8,296,412 B2 | 10/2012 | Secor et al. | |
| 8,515,963 B1 | 8/2013 | Blank, Jr. et al. | |
| 8,577,911 B1 | 11/2013 | Stepinski et al. | |
| 8,707,194 B1 | 4/2014 | Jenkins et al. | |
| 8,712,993 B1 | 4/2014 | Ordonez | |
| 8,752,014 B2* | 6/2014 | Harmon | G06F 9/4446 |
| | | | 717/113 |
| 9,215,240 B2 | 12/2015 | Merza | |
| 9,437,022 B2 | 9/2016 | Vander Broek | |
| 9,507,848 B1 | 11/2016 | Li et al. | |
| 2002/0049713 A1 | 4/2002 | Khemlani et al. | |
| 2002/0194166 A1 | 12/2002 | Fowler | |
| 2003/0100999 A1 | 5/2003 | Markowitz | |
| 2003/0217043 A1 | 11/2003 | Weiss et al. | |
| 2003/0220940 A1 | 11/2003 | Futoransky et al. | |
| 2004/0010564 A1 | 1/2004 | Imaida et al. | |
| 2004/0030741 A1 | 2/2004 | Wolton et al. | |
| 2004/0186826 A1 | 9/2004 | Choi et al. | |
| 2004/0186835 A1* | 9/2004 | Sakurai | G06N 5/025 |
| 2004/0196308 A1 | 10/2004 | Blomquist | |
| 2004/0221296 A1 | 11/2004 | Ogielski et al. | |
| 2004/0236757 A1 | 11/2004 | Caccavale et al. | |
| 2004/0254919 A1 | 12/2004 | Giuseppini | |
| 2005/0015624 A1 | 1/2005 | Ginter et al. | |
| 2005/0027845 A1 | 2/2005 | Secor et al. | |
| 2005/0066027 A1* | 3/2005 | Hakiel | H04L 41/0609 |
| | | | 709/224 |
| 2005/0086187 A1 | 4/2005 | Grosser et al. | |
| 2005/0091198 A1 | 4/2005 | Dettinger et al. | |
| 2005/0172261 A1 | 8/2005 | Yuknewicz et al. | |
| 2005/0198247 A1 | 9/2005 | Perry et al. | |
| 2006/0028470 A1 | 2/2006 | Bennett | |
| 2006/0069635 A1 | 3/2006 | Ram et al. | |
| 2006/0100974 A1 | 5/2006 | Dieberger et al. | |
| 2006/0129554 A1* | 6/2006 | Suyama | G06F 17/30548 |
| 2006/0129914 A1 | 6/2006 | Ellis et al. | |
| 2006/0184529 A1 | 8/2006 | Berg et al. | |
| 2006/0221184 A1 | 10/2006 | Vallone et al. | |
| 2007/0088723 A1 | 4/2007 | Fish | |
| 2007/0100878 A1 | 5/2007 | Fielding et al. | |
| 2007/0118642 A1 | 5/2007 | Kumbalimutt | |
| 2007/0130585 A1 | 6/2007 | Perret et al. | |
| 2007/0174188 A1 | 7/2007 | Fish | |
| 2007/0214164 A1 | 9/2007 | MacLennan et al. | |
| 2007/0280123 A1 | 12/2007 | Atkins et al. | |
| 2008/0071580 A1 | 3/2008 | Marcus et al. | |
| 2008/0086363 A1 | 4/2008 | Kass et al. | |
| 2008/0091466 A1 | 4/2008 | Butler et al. | |
| 2008/0104542 A1 | 5/2008 | Cohen et al. | |
| 2008/0228442 A1 | 9/2008 | Lippincott et al. | |
| 2008/0270369 A1 | 10/2008 | Myerson et al. | |
| 2009/0192985 A1 | 7/2009 | Bolls et al. | |
| 2009/0299998 A1 | 12/2009 | Kim | |
| 2009/0327240 A1 | 12/2009 | Meehan et al. | |
| 2010/0030888 A1* | 2/2010 | Nawabzada | G06F 11/0709 |
| | | | 709/224 |
| 2010/0049692 A1 | 2/2010 | Astito et al. | |
| 2010/0062796 A1 | 3/2010 | Hayton et al. | |
| 2010/0122194 A1 | 5/2010 | Rogers | |
| 2010/0162140 A1 | 6/2010 | Fereira et al. | |
| 2010/0205521 A1 | 8/2010 | Folting | |
| 2010/0313127 A1 | 12/2010 | Gosper et al. | |
| 2010/0325118 A1* | 12/2010 | Takemoto | G06F 17/277 |
| | | | 707/758 |
| 2011/0032260 A1* | 2/2011 | Duggan | H04L 41/0604 |
| | | | 345/440 |
| 2011/0099500 A1* | 4/2011 | Smith | G06F 3/0482 |
| | | | 715/771 |
| 2011/0251992 A1 | 10/2011 | Bethlehem et al. | |
| 2011/0314148 A1 | 12/2011 | Petersen et al. | |
| 2012/0011474 A1 | 1/2012 | Kashik et al. | |
| 2012/0102396 A1 | 4/2012 | Arksey et al. | |
| 2012/0124072 A1 | 5/2012 | Vaidyanathan et al. | |
| 2012/0173985 A1 | 7/2012 | Peppel | |
| 2012/0246303 A1 | 9/2012 | Petersen et al. | |
| 2012/0265727 A1 | 10/2012 | Naryzhnyy et al. | |
| 2012/0265805 A1 | 10/2012 | Samdadiya et al. | |
| 2013/0086587 A1* | 4/2013 | Naik | G06F 11/0781 |
| | | | 718/100 |
| 2013/0151491 A1 | 6/2013 | Gislason et al. | |
| 2013/0151563 A1 | 6/2013 | Addepalli et al. | |
| 2013/0179793 A1* | 7/2013 | Duggan | G06F 3/0484 |
| | | | 715/736 |
| 2013/0212125 A1 | 8/2013 | Wierenga et al. | |
| 2013/0305183 A1 | 11/2013 | Kumagai et al. | |
| 2014/0006871 A1* | 1/2014 | Lakshmanan | H04L 41/065 |
| | | | 714/37 |
| 2014/0032694 A1 | 1/2014 | Cohn et al. | |
| 2014/0053070 A1 | 2/2014 | Powers et al. | |
| 2014/0108437 A1 | 4/2014 | Brown et al. | |
| 2014/0149393 A1 | 5/2014 | Bhatt et al. | |
| 2014/0149592 A1 | 5/2014 | Krishna | |
| 2014/0160238 A1 | 6/2014 | Yim et al. | |
| 2014/0222641 A1 | 8/2014 | Kober et al. | |
| 2014/0222750 A1 | 8/2014 | Uchiumi et al. | |
| 2014/0297666 A1 | 10/2014 | Morris | |
| 2014/0324862 A1 | 10/2014 | Bingham et al. | |
| 2014/0344622 A1 | 11/2014 | Huang et al. | |
| 2015/0058318 A1 | 2/2015 | Blackwell et al. | |
| 2015/0109305 A1 | 4/2015 | Black | |
| 2015/0213631 A1 | 7/2015 | Vander Broek | |
| 2015/0294256 A1* | 10/2015 | Mahesh | G06Q 10/067 |
| | | | 705/7.39 |
| 2016/0125120 A1 | 5/2016 | Yu et al. | |
| 2016/0188744 A1 | 6/2016 | Ito et al. | |
| 2017/0032550 A1 | 2/2017 | Vander Broek | |

(56) References Cited

U.S. PATENT DOCUMENTS

OTHER PUBLICATIONS

Bing search q=display+query+system+event&src=IE—Apr. 4, 2016.*
Bumgarner implementing-splunk Jan. 2013.*
Citation of Link to Video Available Online: Wrangling Big Data from the CPG Industry with Cloudera & Trifacta, Published Oct. 20, 2014. Available at: https://www.youtube.com/watch?v=WuBjZzq8bWw. Last accessed Dec. 15, 2015.
Citation of Link to Application Available Online: Data Wrangler Application, Available at: http://vis.stanford.edu/wrangler/app. Copyright 2011-2013 Stanford Visualization Group. Last accessed Dec. 15, 2015.
Carasso, David, "Exploring Splunk", Search Processing Language (SPL) Primer and Cookbook, First Edition Published Apr. 2012, CITO Research, New York, New York, 156 pages.
Bitincka, Ledion, et al., "Optimizing Data Analysis with a Semi-Structured Time Series Database", splunk Inc., 2010 pp. 1-9.
Non-Final Office Action dated Jan. 11, 2017 in U.S. Appl. No. 14/526,406, 24 pages.
Non-Final Office Action dated Jan. 13, 2017 in U.S. Appl. No. 14/610,717, 19 pages.
Non-Final Office Action dated Jan. 26, 2017 in U.S. Appl. No. 14/526,468, 49 pages.
Non-Final Office Action dated Feb. 24, 2017 in U.S. Appl. No. 14/611,023, 22 pages.
Non-Final Office Action dated Mar. 23, 2017 in U.S. Appl. No. 14/528,951, 13 pages.
Non-Final Office Action dated Apr. 4, 2017 in U.S. Appl. No. 14/611,018, 15 pages.
Non-Final Office Action dated Apr. 4, 2017 in U.S. Appl. No. 14/611,002, 15 pages.
Non-Final Office Action dated Apr. 4, 2017 in U.S. Appl. No. 14/610,702, 13 pages.
Non-Final Office Action dated Apr. 6, 2017 in U.S. Appl. No. 14/610,676, 11 pages.
Non-Final Office Action dated Apr. 6, 2017 in U.S. Appl. No. 14/526,380, 38 pages.
Final Office Action dated May 3, 2017 in U.S. Appl. No. 14/528,939, 31 pages.
Notice of Allowance dated May 5, 2017 in U.S. Appl. No. 15/011,294, 7 pages.
Final Office Action dated May 25, 2017 in U.S. Appl. No. 14/526,478, 36 pages.
Bumgarner, Vincent, "Implementing Splunk: Big Data Reporting and Development for Operational Intelligence", Jan. 2013, 448 pages. Available at: http://2.droppdf.com/files/ug81f/implementing-splunk.pdf.
Non-Final Office Action dated May 18, 2016 in U.S. Appl. No. 15/011,294, 17 pages.
Final Office Action dated Dec. 1, 2016 in U.S. Appl. No. 15/011,294, 8 pages.
Non-Final Office Action dated Dec. 2, 2016 in U.S. Appl. No. 14/528,939, 21 pages.
Splunk Enterprise Security User Manual 2.0 (https://web.archive.org/web/20120712034303/http://docs.splunk.com/Documentation/ES/latest/User/Incident Reviewdashboard; dated Jul. 12, 2012; last accessed Nov. 21, 2016 to show the date of 2.0 user manual; and the complete PDF version of the Splunk Enterprise Security User Manual 2.0 downloaded Nov. 21, 2016—Uploaded in Two Parts.
Field Extractor App—Splunk (see https://www.youtube.com/watch?v=Gfl9Cm9v64Y video; dated Jul. 12, 2013; last accessed Jan. 21, 2016.
Notice of Allowance dated Mar. 9, 2017 in U.S. Appl. No. 15/011,294, 17 pages.
Final Office Action dated Oct. 4, 2017 in U.S. Appl. No. 14/528,951, 24 pages.

* cited by examiner

500

Original Search: 501
search "error | stats count BY host

Sent to peers: 502
search "error | prestats count BY host (map)

Executed by search head: 503
Merge prestats results received from peers (reduce)

| Data Summary | | | |
|---|---|---|---|
| Hosts (5) | Sources (8) | Sourcetypes (3) | |
| filter | | | |
| Host ◊ | | Count ◊ | Last Update ◊ |
| mailsv | ⅰl ⌄ | 9,829 | 4/29/14 1:32:47.000 PM |
| vendor_sales | ⅰl ⌄ | 30,244 | 4/29/14 1:32:46.000 PM |
| www1 | ⅰl ⌄ | 24,221 | 4/29/14 1:32:44.000 PM |
| www2 | ⅰl ⌄ | 22,595 | 4/29/14 1:32:47.000 PM |
| www3 | ⅰl ⌄ | 22,975 | 4/29/14 1:32:45.000 PM |

INCIDENT REVIEW DASHBOARD 710

Incident Review | Actions▼

Status: | Urgency: high | Owner: | Title:
Security domain: | Governance: pci | Search: |

INCIDENT ATTRIBUTE FIELDS 711

TIME RANGE FIELD 712

24 hour window ▼
- Last 15 minutes
- Last 60 minutes
- Last 4 hours
- Last 24 hours
- Last 7 days
- Last 30 days
- Last year
- Real-time
- Other
- All time
- Custom time...

✓ 225 matching events

⊞ Hide    ⊕ Zoom out    ⊕ Zoom to selection    [+] Deselect

[ × ] [ i ] [ ⊞ ] [ 🖫 Save ▼ ] [ 📊 Create ▼ ]  Linear scale ▼  1 bar = 1 hour

TIMELINE 713

120
60

120
60

4:00 AM
Sun Aug 26
2012                    6:00 AM              8:00 AM 225 events in a 24 hour window (real-time) (from 11:29:20 AM August 25 to 11:29:20 AM August 26, 2012)

Select all | Unselect all    « prev  1  2  3  4  5  6  7  8  9  10  next »    | Edit selected events | Edit all 225 matching

EVENTS LIST 714

| Select | Options | Time | Security Domain | Title | Urgency | Status | Owner | |
|---|---|---|---|---|---|---|---|---|
| ☐ | ▶ | 8/26/12 11:11:03.000 AM | Access ▼ | Insecure Or Cleartext Authentication Detected ▼ | ⊕ High ▼ | New ▼ | unassigned ▼ | View details |
| ☐ | ▶ | 8/26/12 11:10:07.000 AM | Access ▼ | Insecure Or Cleartext Authentication Detected ▼ | ⊕ High ▼ | New ▼ | unassigned ▼ | View details |
| ☐ | ▶ | 8/26/12 11:00:39.000 AM | Access ▼ | Account (blinebry) Deleted On (PROD-POS-001) ▼ | ⊕ High ▼ | New ▼ | unassigned ▼ | View details |
| ☐ | ▶ | 8/26/12 11:00:39.000 AM | Access ▼ | Account (beu) Deleted On (COREDEV-006) ▼ | ⊕ High ▼ | New ▼ | unassigned ▼ | View details |
| ☐ | ▶ | 8/26/12 11:00:39.000 AM | Access ▼ | Account (combs) Deleted On (HOST-005) ▼ | ⊕ High ▼ | New ▼ | unassigned ▼ | View details |
| ☐ | ▶ | 8/28/12 | Access ▼ | Account (wisner) Deleted On (BUSDEV-005) ▼ | ⊕ High ▼ | New ▼ | unassigned ▼ | View details |

EVENT SELECTOR TO GENERATE ALTERNATE VIEWS

RELATED APPLICATION

This application is a continuation of U.S. patent application Ser. No. 14/528,939, filed Oct. 30, 2014, entitled "Event View Selector," which claims priority under 35 U.S.C. § 119(e) to U.S. Provisional Patent Application 62/058,069, filed Sep. 30, 2014. The aforementioned applications are incorporated by reference herein in their entireties.

BACKGROUND

Modern data centers may have thousands of host computer systems that operate collectively to service requests from even larger numbers of remote clients in relation to performance data and diagnostic information (e.g., "logs") that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database during a data ingestion phase to facilitate efficient retrieval and analysis later at search time. Conventionally, the performance data is not saved in raw form and is essentially discarded during pre-processing. As such, it may be impossible to do analysis later on for items that are not anticipated up front and therefore are not added as pre-specified data items since the discarded raw data is no longer available after data ingestion.

SUMMARY

An event view selector for a search user interface is described. In one or more implementations, a service may operate to collect and store data as events each of which includes a portion of the data correlated with a point in time. Clients may use a search user interface to access the event data and perform searches by input of search criteria via the search user interface. At least some search criteria may be in the form of extraction rules that are applied at search time to extract corresponding field values from the event data. Responsive to receiving search criteria input via a search user interface, the service may operate to apply a late binding schema to extract events that match the search criteria and provide search results for display via the search user interface.

The search user interface exposes an event view selector operable to enable transitions between multiple different views of the events (e.g., display formats) associated with different levels of detail. The views may include at least a raw view, a list view, and a table view. Responsive to receiving an indication of a view selected via the event view selector, the search user interface may be reconfigured to display the events using the selected view with the corresponding level of detail. In addition or alternatively, the service may facilitate a transition to expose the selected view via the search user interface, such as by reapplying the late binding schema to update search results based on the selected view and/or configuring the selected view for output via the search user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 6B illustrates a data summary dialog that enables a user to select various data sources in accordance with in accordance with one or more implementations.

FIG. 7B illustrates an incident review dashboard in accordance with one or more implementations.

FIG. 8 illustrates a search user interface having an event view selector in a list view in accordance with one or more implementations.

FIG. 10 illustrates a search user interface having an event view selector in a raw view in accordance with one or more implementations.

DETAILED DESCRIPTION

Overview

Figure 1:
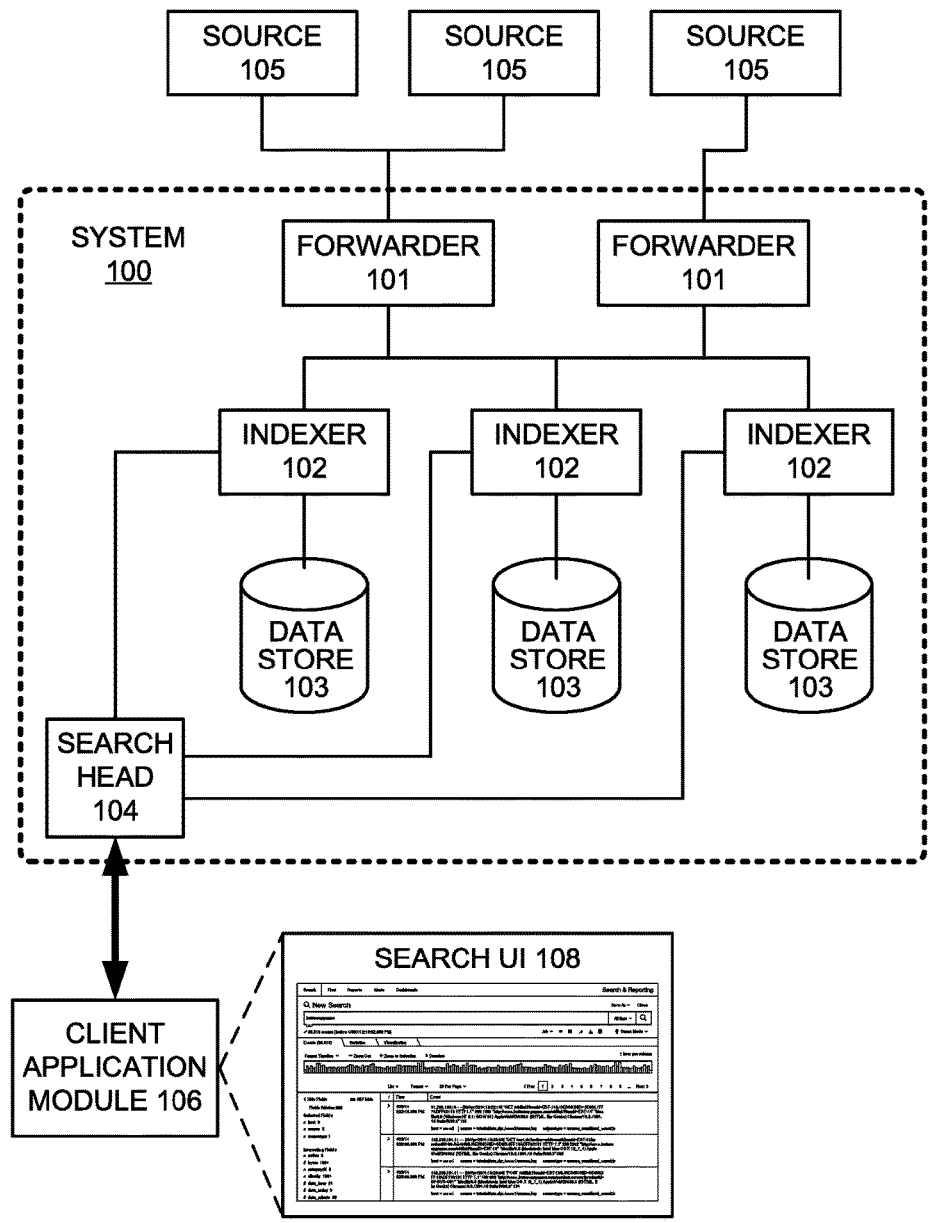
FIG. 1 presents a block diagram of an event-processing system in accordance with one or more implementations.

Data for large scale systems is typically pre-processed prior to being stored based on anticipated data-analysis needs. For example, pre-specified data items can be extracted from the performance data and stored in a database during a data ingestion phase to facilitate efficient retrieval and analysis later at search time. Conventionally, the performance data is not saved in raw form and therefore, it may be impossible to do analysis later on for items that are not anticipated up front since the discarded raw data may no longer be available after data ingestion.

An event view selector for a search user interface is described. In one or more implementations, a service may operate to collect and store data as events each of which includes a portion of the data correlated with a point in time. Client may use a search user interface to access the event data and perform searches by input of search criteria via the search user interface. At least some search criteria may be in the form of extraction rules that are applied at search time to extract corresponding field values from the event data. Responsive to receiving search criteria input via a search user interface, the service may operate to apply a late binding schema to extract events that match the search criteria and provide search results for display via the search user interface. The search user interface exposes an event view selector operable to enable transitions between multiple different views of the events associated with different levels of detail. The views may include at least a raw view, a list view, and a table view. Responsive to receiving an indication of a view selected via the event view selector, the search user interface may be reconfigured to display the events using the selected view with the corresponding level of detail. In addition or alternatively, the service may facilitate a transition to expose the selected view via the search user interface, such as by reapplying the late binding schema to update search results based on the selected view and/or configuring the selected view for output via the search user interface.

In the following discussion, an example environment is first described that may employ the techniques described herein. Example user interfaces and procedures are then described which may be implemented in the example environment as well as other environments. Consequently, the user interfaces and example procedures are not limited to the example environment and the example environment is not limited to the example user interface and procedures enumerated herein.

Example Environment

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," in which each event comprises a collection of performance data and/or diagnostic information that is generated by a computer system and is correlated with a specific point in time. Events can be derived from "time series data," in which time series data includes a sequence of data points (e.g., performance measurements from a computer system) that are associated with successive points in time and are typically spaced at uniform time intervals. Events can also be derived from "structured" or "unstructured" data. Structured data has a predefined format, in which specific data items with specific data formats reside at predefined locations in the data. For example, structured data can include data items stored in fields in a database table. In contrast, unstructured data does not have a predefined format. This means that unstructured data can include various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, in which the flexible schema may be developed and redefined as needed. Note that a flexible schema may be applied to event data "on the fly" as desired (e.g., at search time), rather than at ingestion time of the data as in traditional database systems. Because the schema is not applied to event data until it is desired (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule includes a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

FIG. 1 presents a block diagram of an example event-processing system 100, similar to the SPLUNK® ENTERPRISE system. System 100 includes one or more forwarders 101 that represent functionality to collect data and one or more indexers 102 that represent functionality to store, process, and/or perform operations on this data, in which each indexer may operate on data contained in a specific data store 103. A search head 104 may also be provided that represents functionality to obtain and process search requests from clients and provide results of the search back to the clients, additional details of which are discussed in relation to FIGS. 3 and 4. The forwarders 101, indexers 102, and/or search head 104 may be configured as separate computer systems in a data center, or alternatively may be configured as separate processes implemented via one or more individual computer systems. Data that is collected via the forwarders may be obtained from a variety of different data sources 105. As further illustrated, the search head 104 may operate as a service that interacts with a client application module 106 associated with a client device, such as to obtain search queries and supply search results or other suitable data back to the client application module 106 that is effective to enable the client application module 106 to form search user interfaces 108 through which different views of the data may be exposed. Various examples and details regarding search user interfaces 108, client application modules 106, search queries, and operation of the various components illustrated in FIG. 1 are discussed throughout this document.

For example, during operation, the forwarders 101 identify which indexers 102 will receive the collected data and then forward the data to the identified indexers. Forwarders 101 can also perform operations to strip out extraneous data and detect timestamps in the data. The forwarders next determine which indexers 102 will receive each data item and then forward the data items to the determined indexers 102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 100 and the processes described below with respect to FIGS. 1-5 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 2:
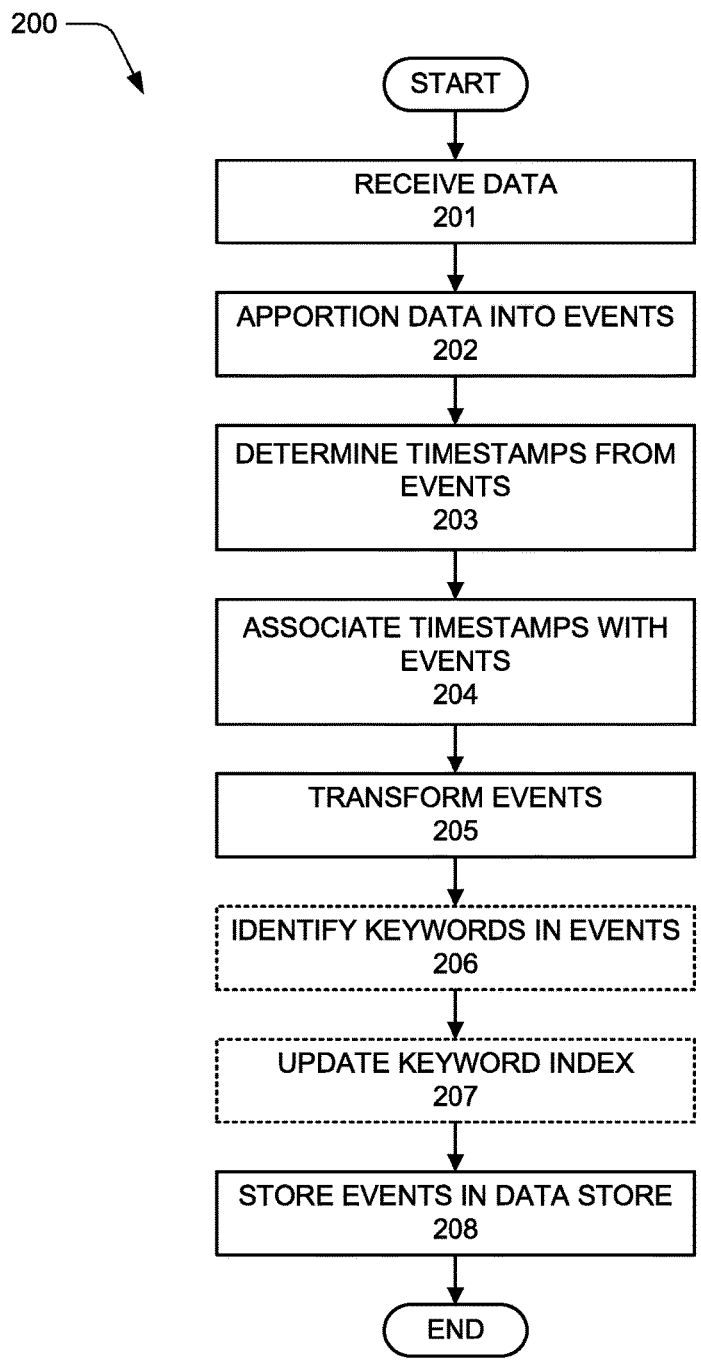
FIG. 2 presents a flowchart illustrating how indexers process, index, and store data received from forwarders in accordance with one or more implementations.

FIG. 2 presents a flowchart 200 illustrating how an indexer processes, indexes, and stores data received from forwarders in accordance with the disclosed embodiments. At block 201, the indexer receives the data from the forwarder. Next, at block 202, the indexer apportions the data into events. Note that the data can include lines of text that are separated by carriage returns or line breaks and an event may include one or more of these lines. During the apportioning process, the indexer can use heuristic rules to automatically determine the boundaries of the events, which for example coincide with line boundaries. These heuristic rules may be determined based on the source of the data, in which the indexer can be explicitly informed about the source of the data or can infer the source of the data by examining the data. These heuristic rules can include regular expression-based rules or delimiter-based rules for determining event boundaries, in which the event boundaries may be indicated by predefined characters or character strings. These predefined characters may include punctuation marks or other special characters including, for example, carriage returns, tabs, spaces or line breaks. In some cases, a user can fine-tune or configure the rules that the indexers use to determine event boundaries in order to adapt the rules to the user's specific requirements.

Next, the indexer determines a timestamp for each event at block 203. As mentioned above, these timestamps can be determined by extracting the time directly from data in the event, or by interpolating the time based on timestamps from temporally proximate events. In some cases, a timestamp can be determined based on the time the data was received or generated. The indexer subsequently associates the determined timestamp with each event at block 204, for example by storing the timestamp as metadata for each event.

Then, the system can apply transformations to data to be included in events at block 205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in block 206. Then, at block 207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 102 is responsible for storing and searching a subset of the events contained in a corresponding data store 103. By distributing events among the indexers and data stores, the indexers can analyze events for a query in parallel, for example using map-reduce techniques, in which each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on 30 Apr. 2014, and in U.S. patent application Ser. No. 14/266,817 also filed on 30 Apr. 2014.

1.4 Query Processing

Figure 3:
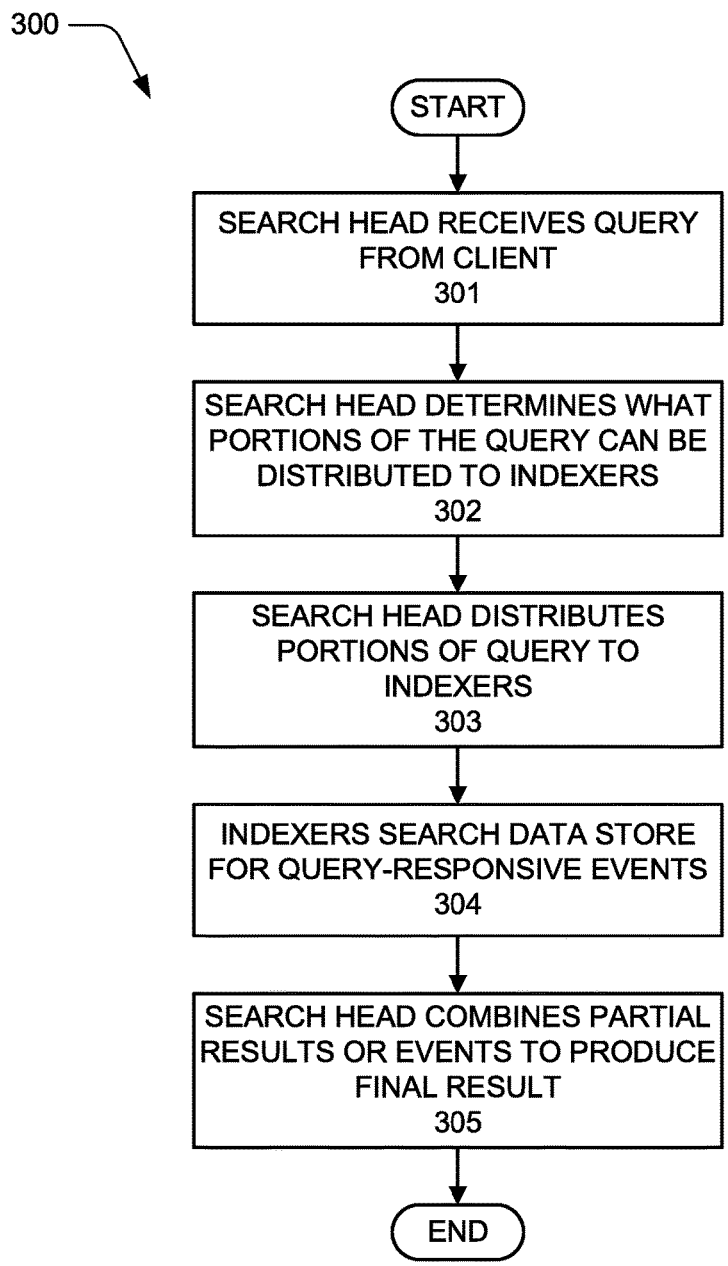
FIG. 3 presents a flowchart illustrating how a search head and indexers perform a search query in accordance with one or more implementations.

FIG. 3 presents a flowchart 300 illustrating how a search head 104 and 102 indexers perform a search query in accordance with the disclosed embodiments. At the start of this process, a search head receives a search query from a client (e.g., client application module 106) at block 301. Next, at block 302, the search head analyzes the search query to determine what portions can be delegated to indexers and what portions need to be executed locally by the search head. At block 303, the search head distributes the determined portions of the query to the indexers. Note that commands that operate on single events can be trivially delegated to the indexers, while commands that involve events from multiple indexers are harder to delegate.

Then, at block 304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 304 may involve using the late-binding schema to extract values for specified fields from events at the time the query is processed. Next, the indexers can either send the relevant events back to the search head, or use the events to calculate a partial result, and send the partial result back to the search head.

Finally, at block 305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by system 100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these parameters to query the indexers to obtain a superset of the eventual results. Then, during a filtering stage, the search head can perform field-extraction operations on the superset to produce a reduced set of search results.

1.5 Field Extraction

Figure 4:
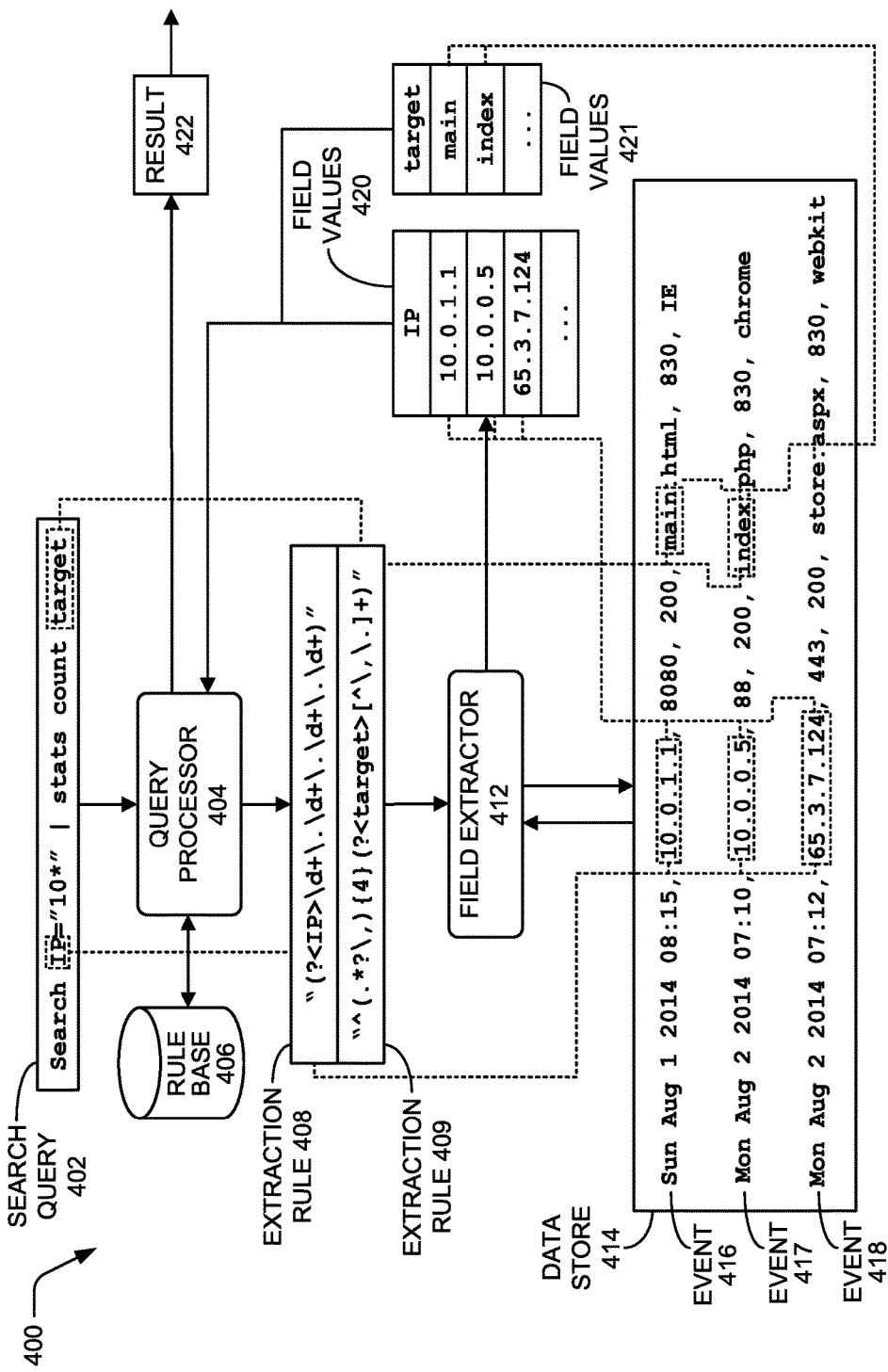
FIG. 4 presents a block diagram of a system for processing search requests that uses extraction rules for field values in accordance one or more implementations.

FIG. 4 presents a block diagram 400 illustrating how fields can be extracted during query processing in accordance with the disclosed embodiments. At the start of this process, a search query 402 is received at a query processor 404. Query processor 404 includes various mechanisms for processing a query, wherein these mechanisms can reside in a search head 104 and/or an indexer 102. Note that the example search query 402 illustrated in FIG. 4 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "I" operates on the results produced by the first command, and so on for additional commands. Search query 402 can also be expressed in other query languages, such as the Structured Query Language ("SQL") or any suitable query language.

Upon receiving search query 402, query processor 404 sees that search query 402 includes two fields "IP" and "target." Query processor 404 also determines that the values for the "IP" and "target" fields have not already been extracted from events in data store 414, and consequently determines that query processor 404 needs to use extraction rules to extract values for the fields. Hence, query processor 404 performs a lookup for the extraction rules in a rule base 406, in which rule base 406 maps field names to corresponding extraction rules and obtains extraction rules 408-409, extraction rule 408 specifies how to extract a value for the "IP" field from an event, and extraction rule 409 specifies how to extract a value for the "target" field from an event. As is illustrated in FIG. 4, extraction rules 408-409 can include regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

Next, query processor 404 sends extraction rules 408-409 to a field extractor 412, which applies extraction rules 408-409 to events 416-418 in a data store 414. Note that data store 414 can include one or more data stores, and extraction rules 408-409 can be applied to large numbers of events in data store 414, and are not meant to be limited to the three events 416-418 illustrated in FIG. 4. Moreover, the query processor 404 can instruct field extractor 412 to apply the extraction rules to all the events in a data store 414, or to a subset of the events that have been filtered based on some criteria.

Next, field extractor 412 applies extraction rule 408 for the first command "Search IP="10*"" to events in data store 414 including events 416-418. Extraction rule 408 is used to extract values for the IP address field from events in data store 414 by looking for a pattern of one or more digits, followed by a period, followed again by one or more digits, followed by another period, followed again by one or more digits, followed by another period, and followed again by one or more digits. Next, field extractor 412 returns field values 420 to query processor 404, which uses the criterion IP="10*" to look for IP addresses that start with "10". Note that events 416 and 417 match this criterion, but event 418 does not, so the result set for the first command is events 416-417.

Query processor 404 then sends events 416-417 to the next command "stats count target." To process this command, query processor 404 causes field extractor 412 to apply extraction rule 409 to events 416-417. Extraction rule 409 is used to extract values for the target field for events 416-417 by skipping the first four commas in events 416-417, and then extracting all of the following characters until a comma or period is reached. Next, field extractor 412 returns field values 421 to query processor 404, which executes the command "stats count target" to count the number of unique values contained in the target fields, which in this example produces the value "2" that is returned as a final result 422 for the query.

Note that query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or chart, generated from the values.

1.6 Example Search Screen

Figure 6A:
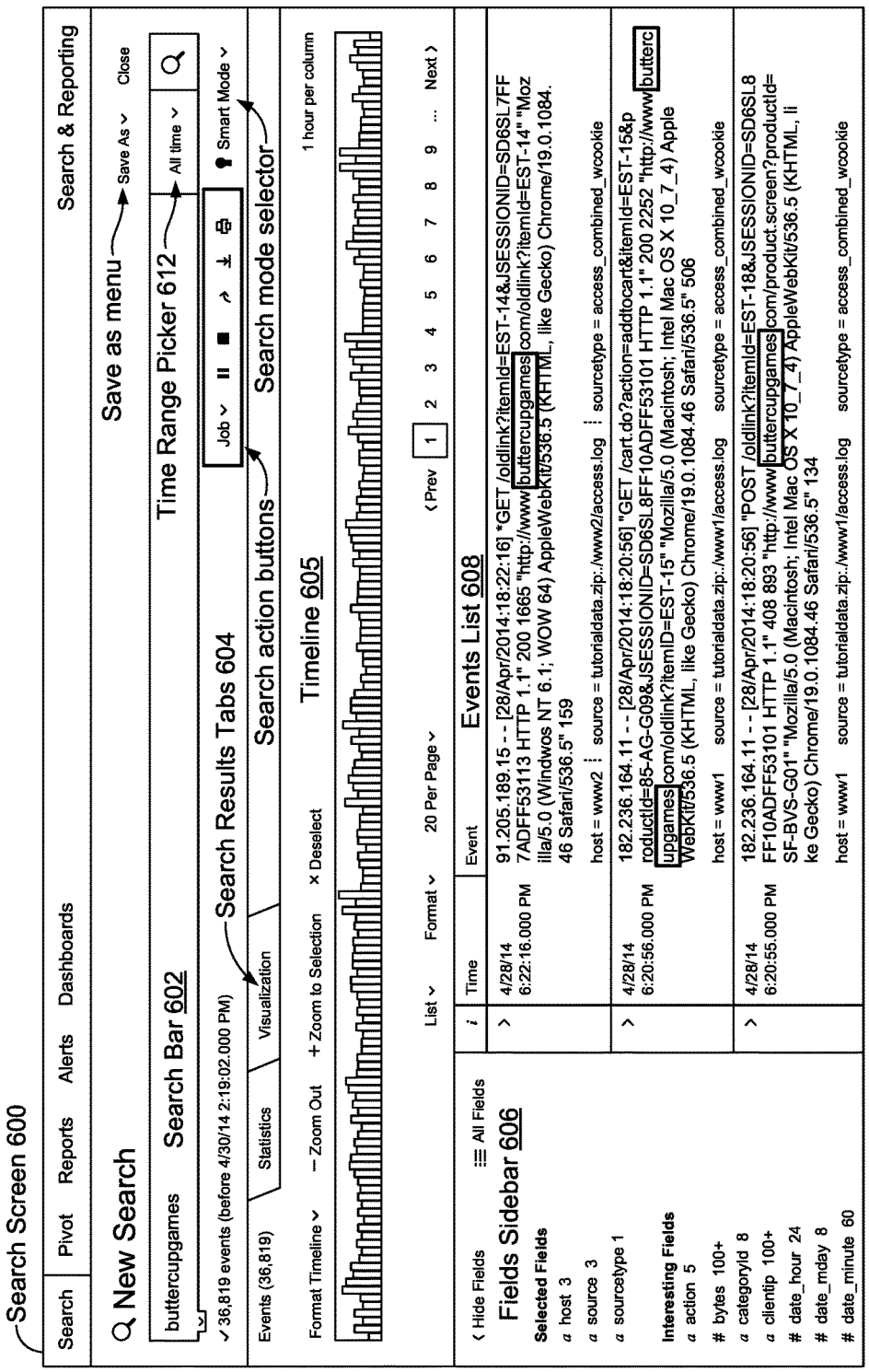
FIG. 6A illustrates a search screen in accordance with one or more implementations.

FIG. 6A depicts an example search screen 600 that represent an illustrative example of a search user interface 108 in accordance with one or more implementations. Search screen 600 includes a search bar 602 that accepts user input in the form of a search string. It also includes a time range picker 603 that enables the user to specify a time range for the search. For "historical searches" the user can select a specific time range, or alternatively a relative time range, such as "today," "yesterday" or "last week." For "real-time searches," the user can select the size of a preceding time window to search for real-time events. Search screen 600 also initially displays a "data summary" dialog as is illustrated in FIG. 6B that enables the user to select different sources for the event data, for example by selecting specific hosts and log files.

After the search is executed, the search screen 600 can display the results through search results tabs 604, wherein search results tabs 604 includes: an "events tab" that displays various information about events returned by the search; a "statistics tab" that displays statistics about the search results; and a "visualization tab" that displays various visualizations of the search results. The events tab illustrated in FIG. 6A displays a timeline graph 605 that graphically illustrates the number of events that occurred in one-hour intervals over the selected time range. It also displays an events pane 606 that enables a user to view the event data in each of the returned events and may support a plurality of different views of the event data as discussed herein. It additionally displays a fields sidebar 608 that includes statistics about occurrences of specific fields in the returned events, including "selected fields" that are pre-selected by the user, and "interesting fields" that are automatically selected by the system based on pre-specified criteria. In one or more implementations, the fields sidebar 608 may also be configured to facilitate selections of fields in various ways.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

Figure 5:
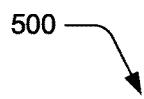
FIG. 5 illustrates an example search query received from a client and executed by search peers in accordance with one or more implementations.

To facilitate faster query processing, a query can be structured as a map-reduce computation, wherein the "map" operations are delegated to the indexers, while the corresponding "reduce" operations are performed locally at the search head. For example, FIG. 5 illustrates an example 500 of how a search query 501 received from a client at search head 104 can split into two phases, including: (1) a "map phase" comprising subtasks 502 (e.g., data retrieval or simple filtering) that may be performed in parallel and are "mapped" to indexers 102 for execution, and (2) a "reduce phase" comprising a merging operation 503 to be executed by the search head when the results are ultimately collected from the indexers.

During operation, upon receiving search query 501, search head 104 modifies search query 501 by substituting "stats" with "prestats" to produce search query 502, and then distributes search query 502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 3, or may alternatively distribute a modified version (e.g., a more restricted version) of the search query to the search peers. In this example, the indexers are responsible for producing the results and sending them to the search head. After the indexers return the results to the search head, the search head performs the merging operations 503 on the results. Note that by executing the computation in this way, the system effectively distributes the computational operations while minimizing data transfers.

1.7.2 Keyword Index

As described above with reference to the flow charts 200, 300 in FIGS. 2 and 3, event-processing system 100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of system 100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process each of the events that have a specific field-value combination, the system can use the references in the summarization table entry to directly access the events to extract further information without having to search each of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, in which the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover each of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. (This is possible if results from preceding time periods can be computed separately and combined to generate an updated report. In some cases, it is not possible to combine such incremental results, for example where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011.

1.8 Security Features

The SPLUNK® ENTERPRISE platform provides various schemas, dashboards and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. (The process of detecting security threats for network-related information is further described in U.S. patent application Ser. Nos. 13/956,252, and 13/956,262.) Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 7A:
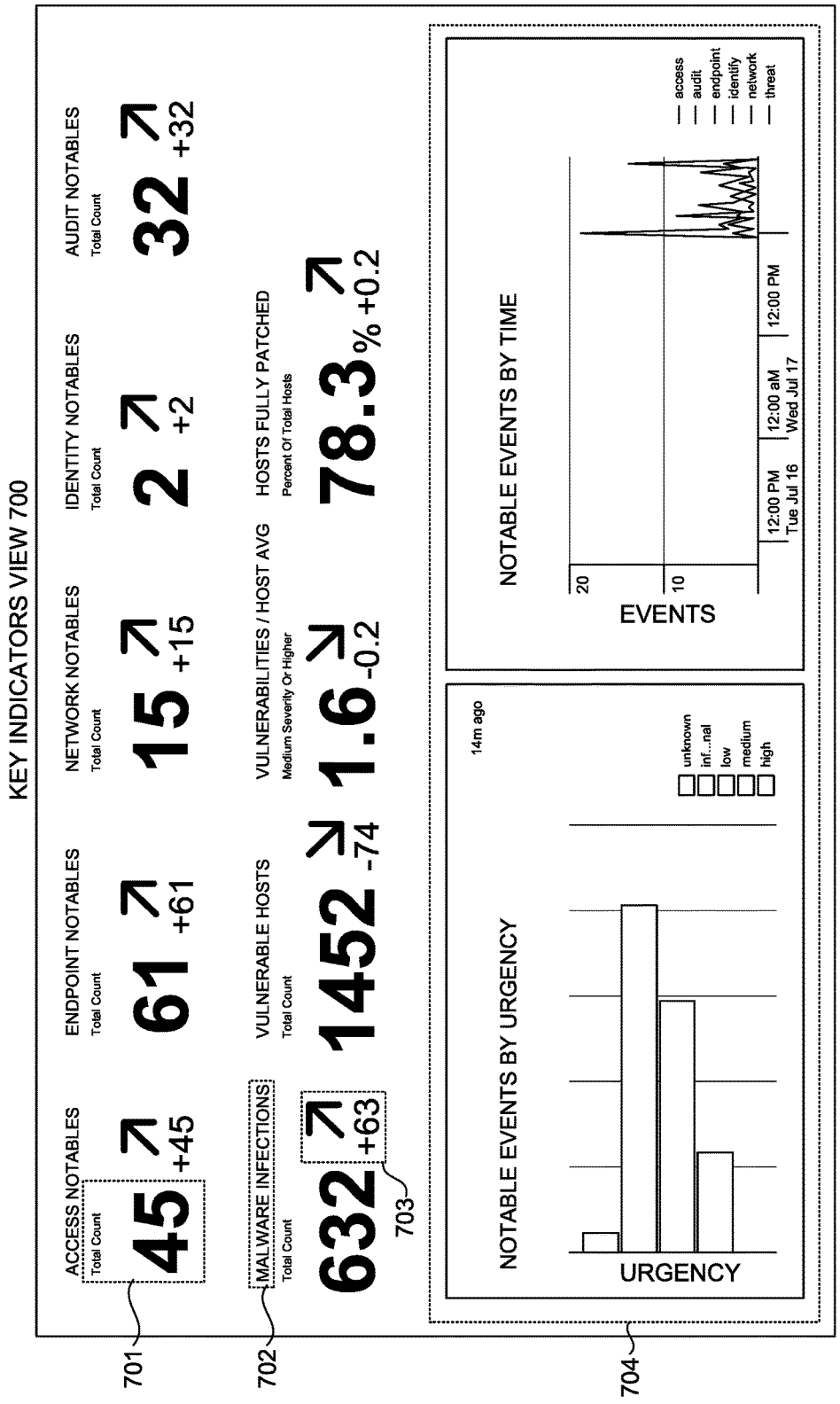
FIG. 7A illustrates a key indicators view in accordance with one or more implementations.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 7A illustrates an example key indicators view 700 that comprises a dashboard, which can display a value 701, for various security-related metrics, such as malware infections 702. It can also display a change in a metric value 703, which indicates that the number of malware infections increased by 63 during the preceding interval. Key indicators view 700 additionally displays a histogram panel 704 that displays a histogram of notable events organized by urgency values, and a histogram of notable events 705 organized by time intervals. This key indicators view is described in further detail in pending U.S. patent application Ser. No. 13/956,338 filed Jul. 31, 2013.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 7B illustrates an example incident review dashboard 710 that includes a set of incident attribute fields 711 that, for example, enables a user to specify a time range field 712 for the displayed events. It also includes a timeline 713 that graphically illustrates the number of incidents that occurred in one-hour time intervals over the selected time range. It additionally displays an events list 714 that enables a user to view a list of each of the notable events that match the criteria in the incident attributes fields 711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed 29 Jan. 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 7C:
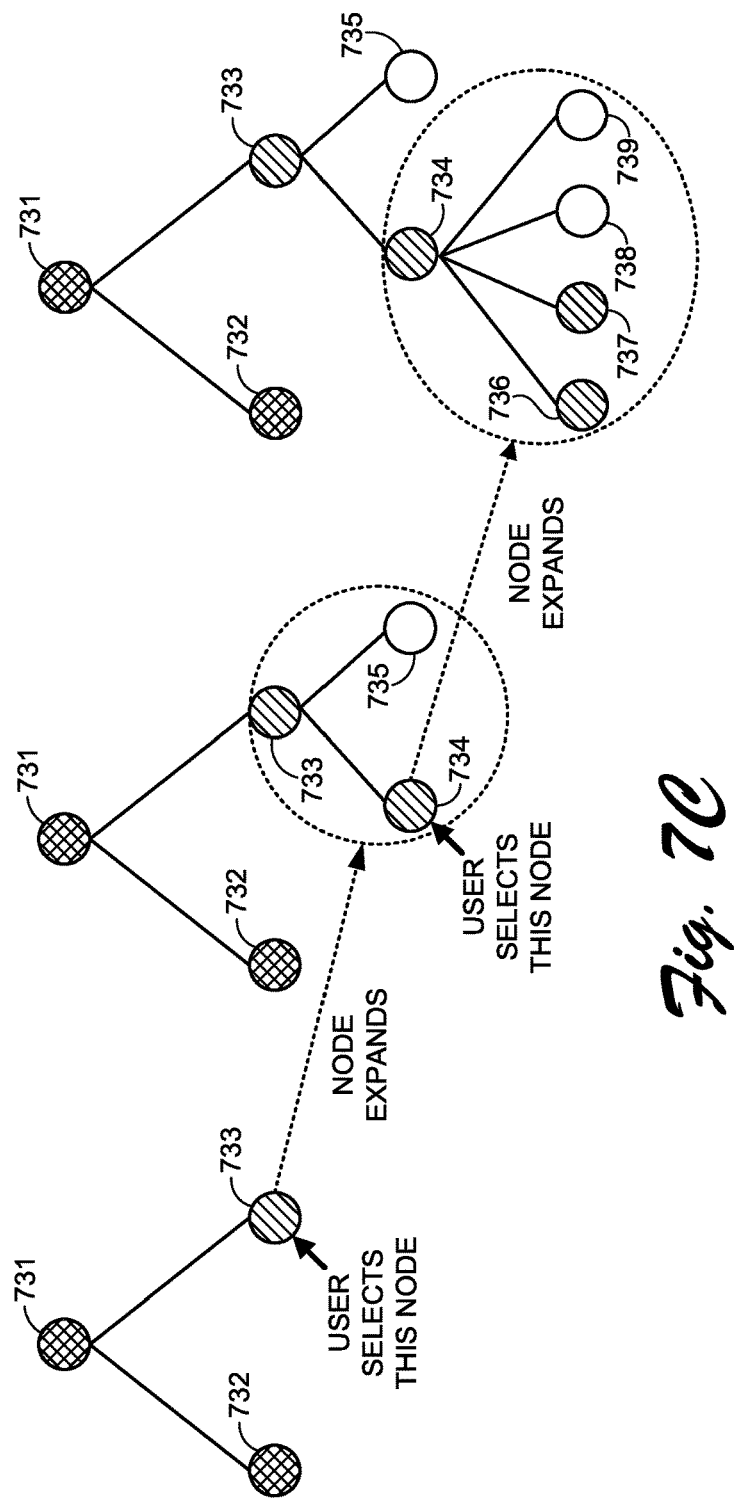
FIG. 7C illustrates a proactive monitoring tree in accordance with one or more implementations.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 7C, wherein nodes 733 and 734 are selectively expanded. Note that nodes 731-739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on 15 Apr. 2014, which is hereby incorporated herein by reference for all possible purposes.

Figure 7D:
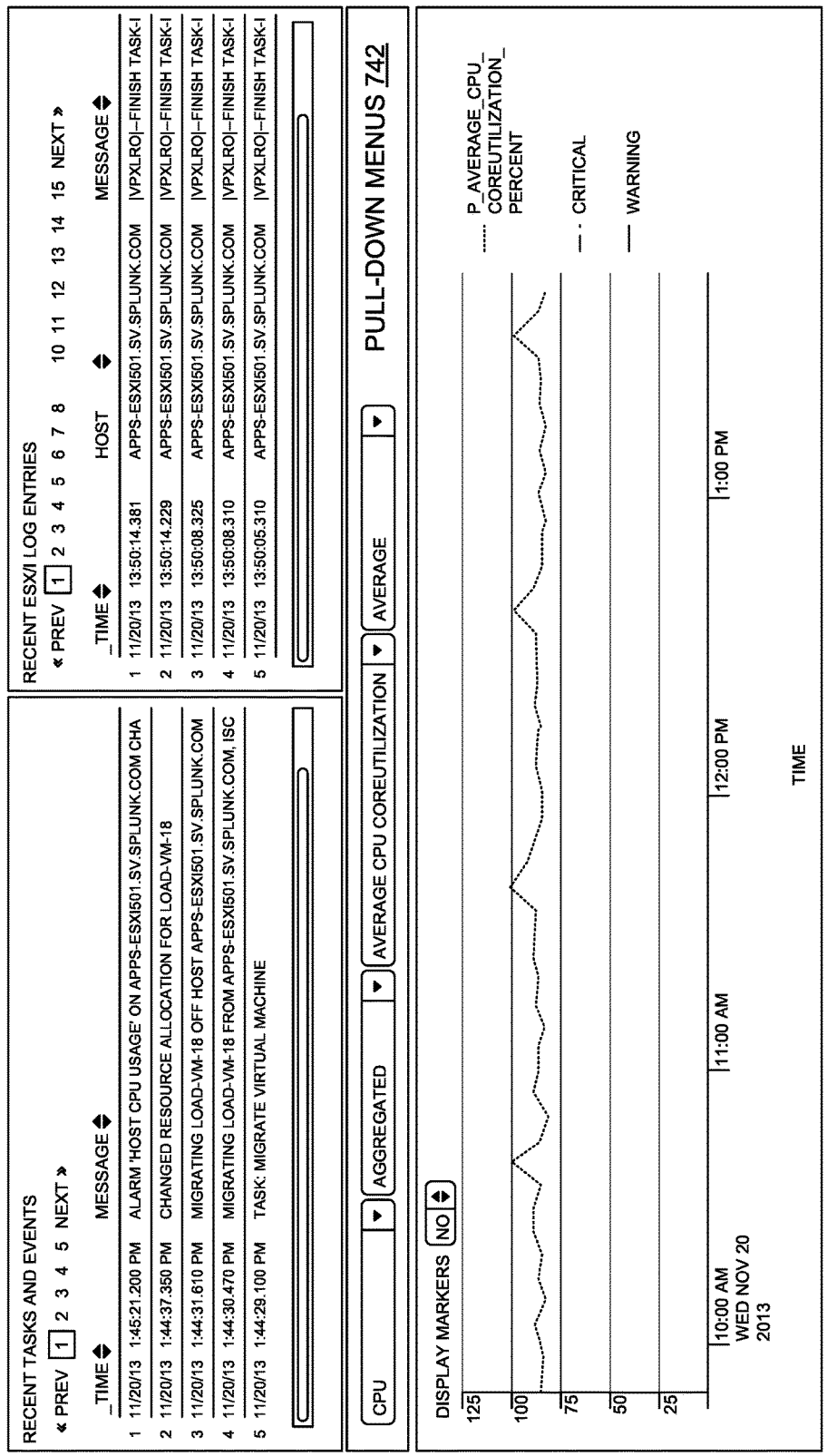
FIG. 7D illustrates a screen displaying both log data and performance data in accordance with one or more implementations.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 7D displays a listing of recent "tasks and events" and a listing of recent "log entries" for a selected time range above a performance-metric graph for "average CPU core utilization" for the selected time range. Note that a user is able to operate pull-down menus 742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on 29 Jan. 2014, which is hereby incorporated herein by reference for all possible purposes.

Example User Interfaces and Procedures

The following discussion describes user interface and techniques that may be implemented utilizing the previously described systems and devices. For example, search user interfaces 108 may be configured in various ways to facilitate searches of and other interaction with data stored as events in one or more data stores as noted previously. In one or more implementations, user interfaces may be formed by a client application module 106 based upon data that is supplied by a search service, such as via components of the example system 100 above. The service may communicate data in response to search queries from clients that is effective to enable a client application module 106 to form search user interfaces 108 through which different views of the data may be exposed. In addition or alternatively, the service may operate to configure search user interfaces, views, or pages on the server-side based on results of searches for communication to and display by clients via a client application module 106 executed on the client-side.

Event View Selector

In one or more implementations, a search user interface 108, such as the example search screen 600 described above, may be configured to expose an event view selector that is operable to cause transitions between multiple different views of events or "display formats" presented within the search user interface. The multiple different views may be configured to provide different representations of events, fields, and metadata included in search results generated for search queries. This may include organizing the data in different ways, providing different levels of detail, exposing or omitting values and headers for fields and/or other metadata derived from the events, grouping events in categories, collapsing or expanding portions, and so forth.

By way of example and not limitation, the multiple different views may include one or more of a list view, a table view and a raw view. Other different types of views are also contemplated that may be supported by a search user interface. Generally, different views may be configured to provide different levels of detail with respect to how much of the data for events is shown and/or whether fields and corresponding values are or are not presented in conjunction with the event data. The event view selector may be configured as any suitable user interface instrumentality that enables selection of a selected view from among multiple different views that are supported by the system. By way of example and not limitation, the event view selector may be configured to incorporate one or more of a list box element, a radio control, a slider control, a menu, icons representing the multiple different views, links, check boxes, tabs, or buttons configured to enable selections between the multiple different views.

As noted above, data may be stored as events with each event including a portion of the data associated with a timestamp or other indication of a point in time. The data may represent various raw data, which may include but is not limited to one or more of unstructured data, log data, network data, packet data, wire data, machine data, performance measurements, or time-series data. Moreover, field values for fields may be retrieved by applying a late binding schema that implements one or more extraction rules configured to define the fields and indicate how to derive the field values from event data at search time.

In this context, the list view is configured to represent portions of the data for events in a list in conjunction with field values that are extracted based on application of the late binding schema. For example, in list view events may be represented as a list of rows where each row corresponds to an individual event. One or more selected fields/field values may also be shown in the rows along with the event data for each field. Individual rows in the list view may be configured to show event data with the field values and/or labels for a corresponding event. A variety of techniques may be used to select the fields to show in list view and/or other views some example of which are discussed above and below.

The table view is configured to represent field values extracted based on application of a late binding schema for one or more selected fields in a table form without showing corresponding event data. In other words, selection of table view transitions the user interface to present a view in which selected fields/field values are represented in a compact or summarized form without showing the underlying data for the events. In table view, field headers having labels (e.g., field names) may also be shown, such as in a row at the top of the table to produce columns that correspond to the selected fields. The field headers may be configured to enable various manipulations of the table data, such as changing column widths, removal of fields using a defined action such as a drag and drop action or selection of a delete control, rearranging the columns one to another, sorting/filtering of the data based on values in one or more columns and so forth. Individual rows in the table view may be configured to show just the field values for a corresponding event.

The raw view is configured to represent the portions of the data for events in a raw format. In raw view, underlying event data for events is represented without showing the fields/field values as in list view or table view. Here, individual rows may be configured to show just the underlying event data. Further details and examples regarding aspects of the event view selector and different views are discussed in relation to example search user interfaces represented in FIGS. 8 to 11.

Figure 8:
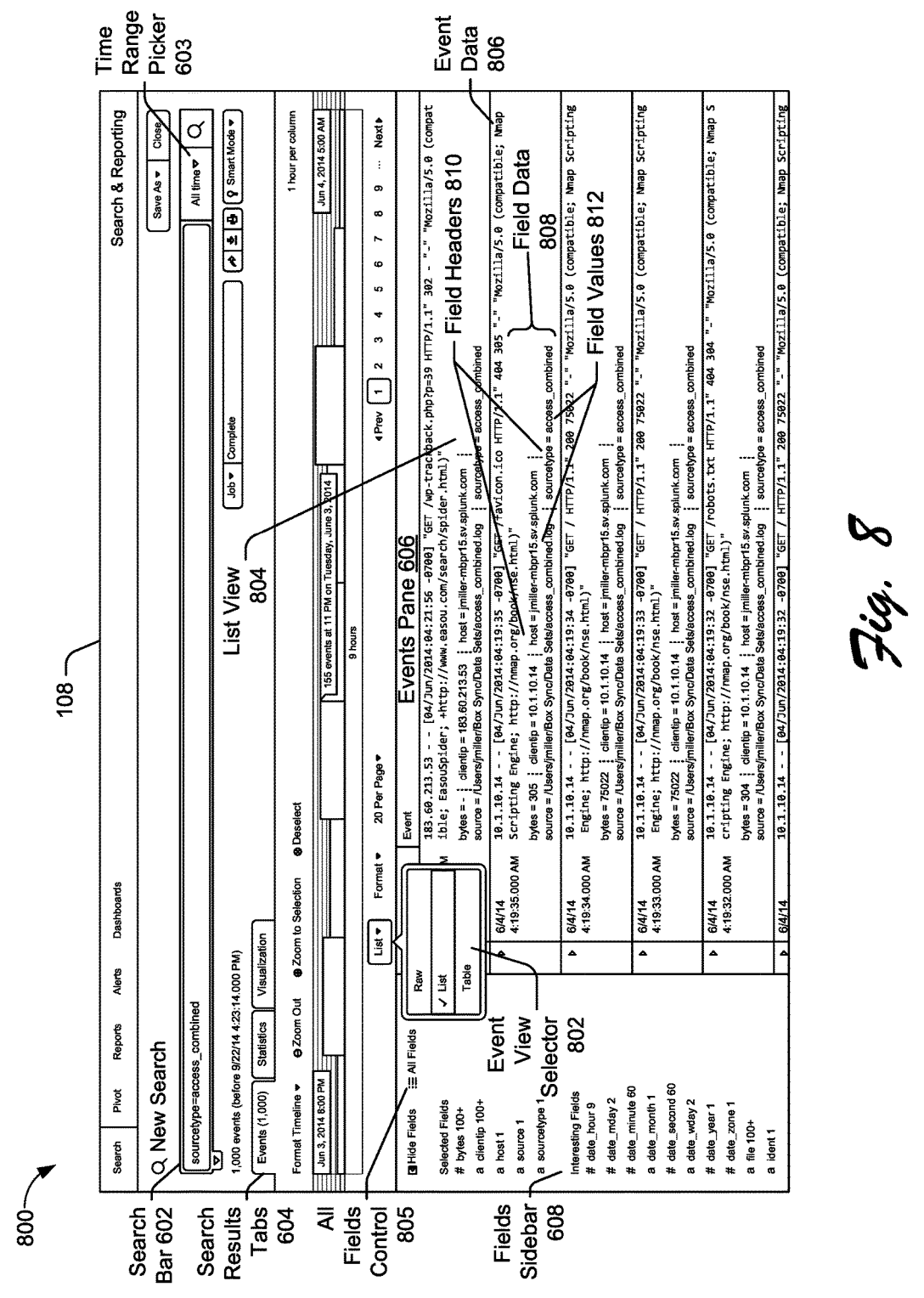

FIG. 8 illustrates generally at 800 an example search user interface 108 having an event view selector in a list view in accordance with one or more implementations. In the depicted example, search user interface 108 includes a search bar 602, time range picker 603, search results tab 604, events pane 606, and field sidebar 608 as discussed previously. The example search user interface 108 also includes an event view selector 802 that may be configured and operate as described above and below. Here, the event view selector 802 is implemented as a list box element configured to provide a list of the multiple different views as selectable items. The event view selector 802 may be further configured to initiate communication of an indication regarding the selected view responsive to a selection from the list. The indication may cause operations by the client and/or service to update the search user interface according to the selected view. The supported views as shown in FIG. 8 include a raw view, list view, and table view. Further, the event view selector 802 may visually represent the selected view such as using a checkmark, highlighting, different colored text, and/or other indicators. Other configurations of an event view selector 802 are also contemplated examples of which were previously discussed.

In the example shown, a list view 804 is illustrated as being the selected view and accordingly is depicted as being rendered within the events pane 606. In particular, each row in the in the example list view 804 corresponds to an event and includes underlying event data 806 corresponding to the event and field data 808 (e.g., including field headers 810 and field values 812) that may be extracted for the event. Field data may be shown for one or more selected fields. Fields to include in queries may be selected in various ways such as via a field picker exposed via controls associated with individual events in the events pane 606, interaction (e.g., selection, hovering, clicking, etc.) with fields enumerated in the fields sidebar 606, an all fields control 805 operable to launch a picker showing all available fields, or otherwise. Various selected fields may be identified via the fields sidebar 606 as further represented in FIG. 8.

As mentioned, selections made via the event view selector 802 may cause transitions between different views of the event data. For example, selection of list view 804 may cause a transition from the table view or raw view discussed below in relation to FIG. 9 and FIG. 10, respectively, or another view of the event data. Generally speaking, a client may obtain input indicative of a selected view via the event view selector 802. In response, the client may cause a transition to a selected view by reconfiguring the search user interface to display events in accordance with a selected view. This may involve operations setting the visibility of items (e.g., fields, events, raw data, etc.) to correspond to the selected view, reformatting of the events pane 606 at the client, rendering the selected view, and so forth. In this approach, the client processes search results that have been returned based on the current search to form the different view in response to the input indicative of a selected view.

In another approach, the client may communicate indications of the selected view to a service to cause operations by the service to update the view. The service may then perform various operations to facilitate transitions to expose a selected view responsive to receiving an indication of a selected view. For example, the service may operate to determine updated search criteria that include modified extraction rules corresponding to a selected view and reapply a late binding schema to extract events that match the updated search criteria using the one or more extraction rules as modified. In addition or alternatively, the service may operate to configure the selected view and communicate data effective to enable the client computing device to expose the view to the client computing device. In another example, the view may be configured at the client based on communication of data by the service effective to enable the client to form the view.

Figure 9:
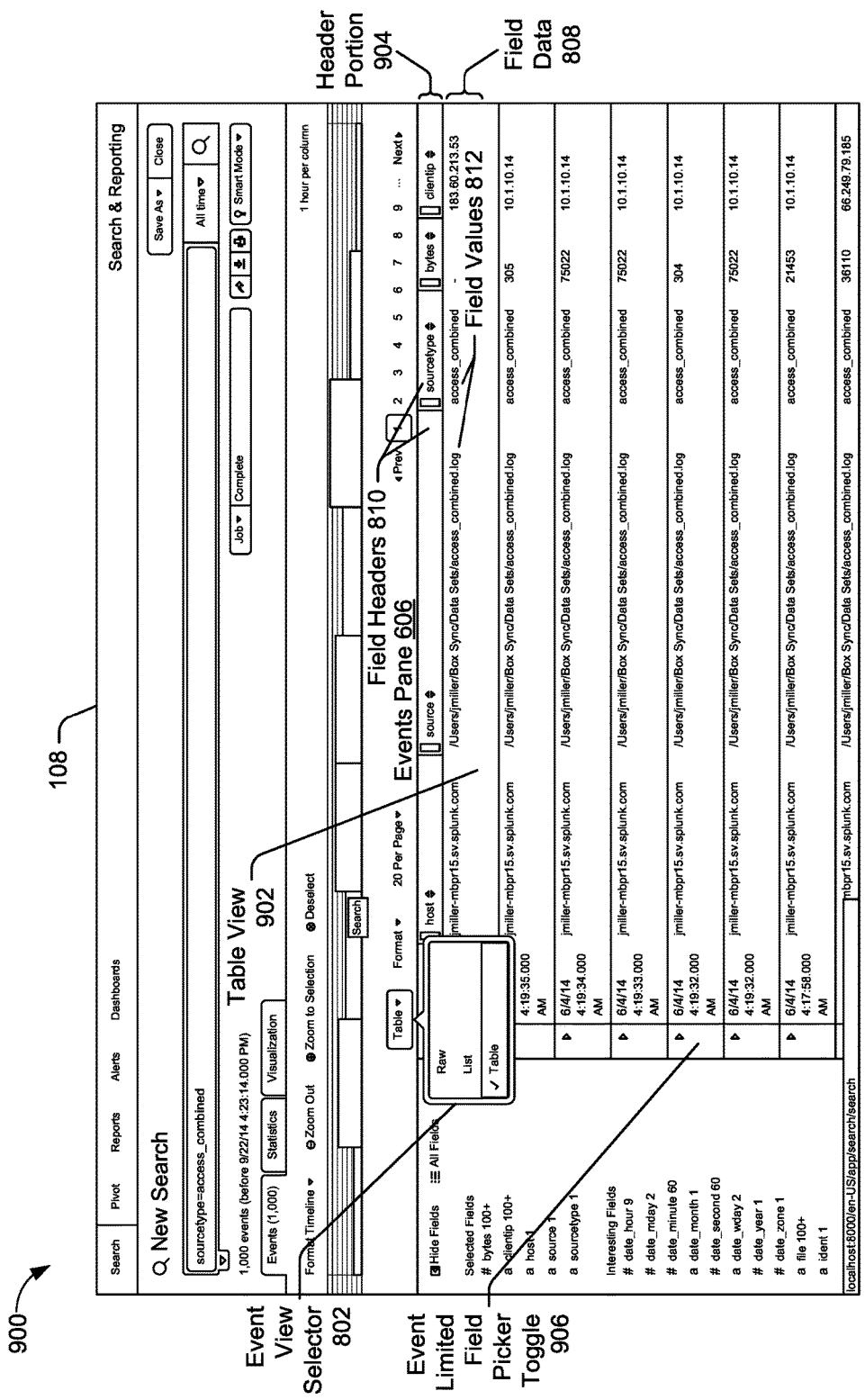
FIG. 9 illustrates a search user interface having an event view selector in a table view in accordance with one or more implementations.

FIG. 9 illustrates generally at 900 a search user interface 108 having an event view selector in a table view in accordance with one or more implementations. The table view 902 shown in this example may be output in the events pane 606 responsive to selection of table view via the event view selector 802 in the manner previously described. Selection of table view 902 may cause a transition from the list view 804 of FIG. 8, raw view discussed below in relation to FIG. 10, or another view of the event data. In the table view 902, a compact and/or summarized view is shown in which each row displays field data 808 for the event without including underlying event data 806. Rows may be configured to show both field values 812 and field headers 810 as in the example of FIG. 8. In addition or alternatively, a header portion 904 may be exposed to provide field headers 810 as represented in FIG. 9. In this example, the table includes rows corresponding to individual events and columns corresponding to individual fields. As mentioned above, the header portion 904 and field headers may enable various functionality to further refine the view such as changing column widths, removal of fields using a defined action such as a drag and drop action or selection of a delete control, rearranging the columns one to another, sorting/filtering of the data based on values in one or more columns and so forth. When the header portion 904 is employed, the rows may show just field values 812 for the events in the rows as represented in FIG. 9.

FIG. 9 additionally depicts association of an event limited field picker toggle 906 with each of the events (e.g., each row). The event limited field picker toggle 906 is representative of any suitable user interface instrumentality that is operable to expose an event limited field picker for a corresponding event. By way of example, the event limited field picker toggle 906 is configured as a selectable arrow control that may be selectively toggled to show or hide a corresponding event limited field picker. Other types of user interface instrumentalities are also contemplated such as a button, selectable text, an icon, and so forth. The event limited field picker toggle 906 is discussed with respect to the table view, but corresponding toggles may be employed with other views as represented in relation to the list view and raw view of FIGS. 8 and 10, respectively Details and examples regarding event limited field pickers are discussed in relation to FIGS. 12 to 16 below. By way of introduction, though, the event limited field picker is configured to expose details regarding a corresponding event and include various functionality to perform operations with respect to fields associated with the corresponding event. These operations may include but are not limited to making selections to specify fields that are visible and hidden for a view, selecting or deselecting fields for a search query, refining a time period specified for the query, specifying tags for field values pairs, setting query constraints with respect to fields, and initiating custom actions, to name a few examples.

Figure 10:
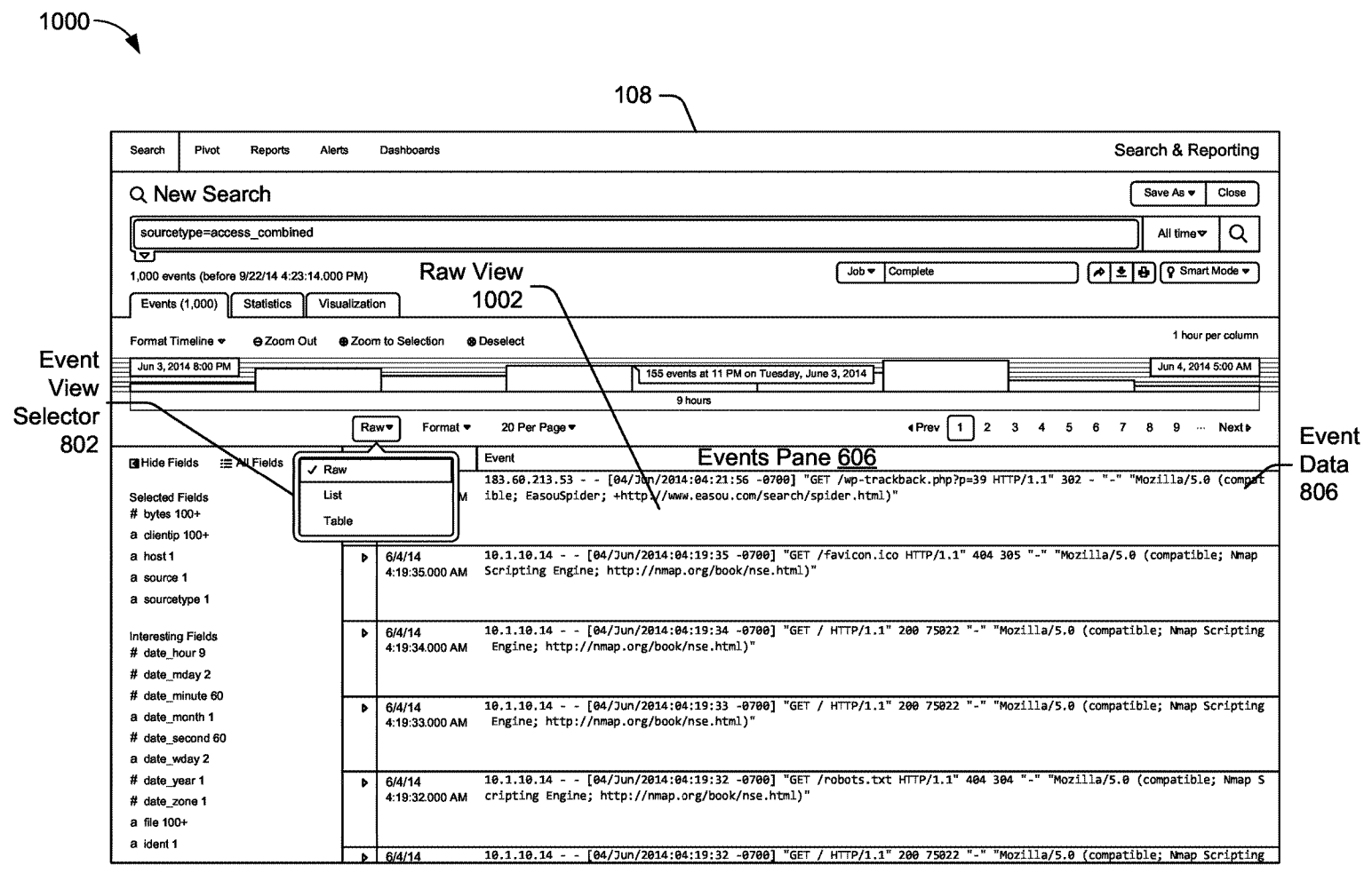

FIG. 10 illustrates generally at 1000 a search user interface having an event view selector in a raw view in accordance with one or more implementations. The raw view 1002 shown in this example may be output in the events pane 606 responsive to selection of raw view via the event view selector 802 in the manner previously described. Selection of raw view 1002 may cause a transition from the list view 804 of FIG. 8, table view 902 of FIG. 9, or another view of the event data. In the raw view 1002, underlying event data is shown in a raw or "unaltered" format. The raw view 1002 may provide a view of the event data 806 as stored in the data store and without including additional field data 808, metadata, statistics, or parameters that may be derived from the event data 806 and exposed in other views. In addition or alternatively, the raw view 1002 may provide a view with limited detail and/or metadata, such as by presenting the raw data for events along with an associated timestamps for organization, sorting, and identification of the event data.

Figure 11:
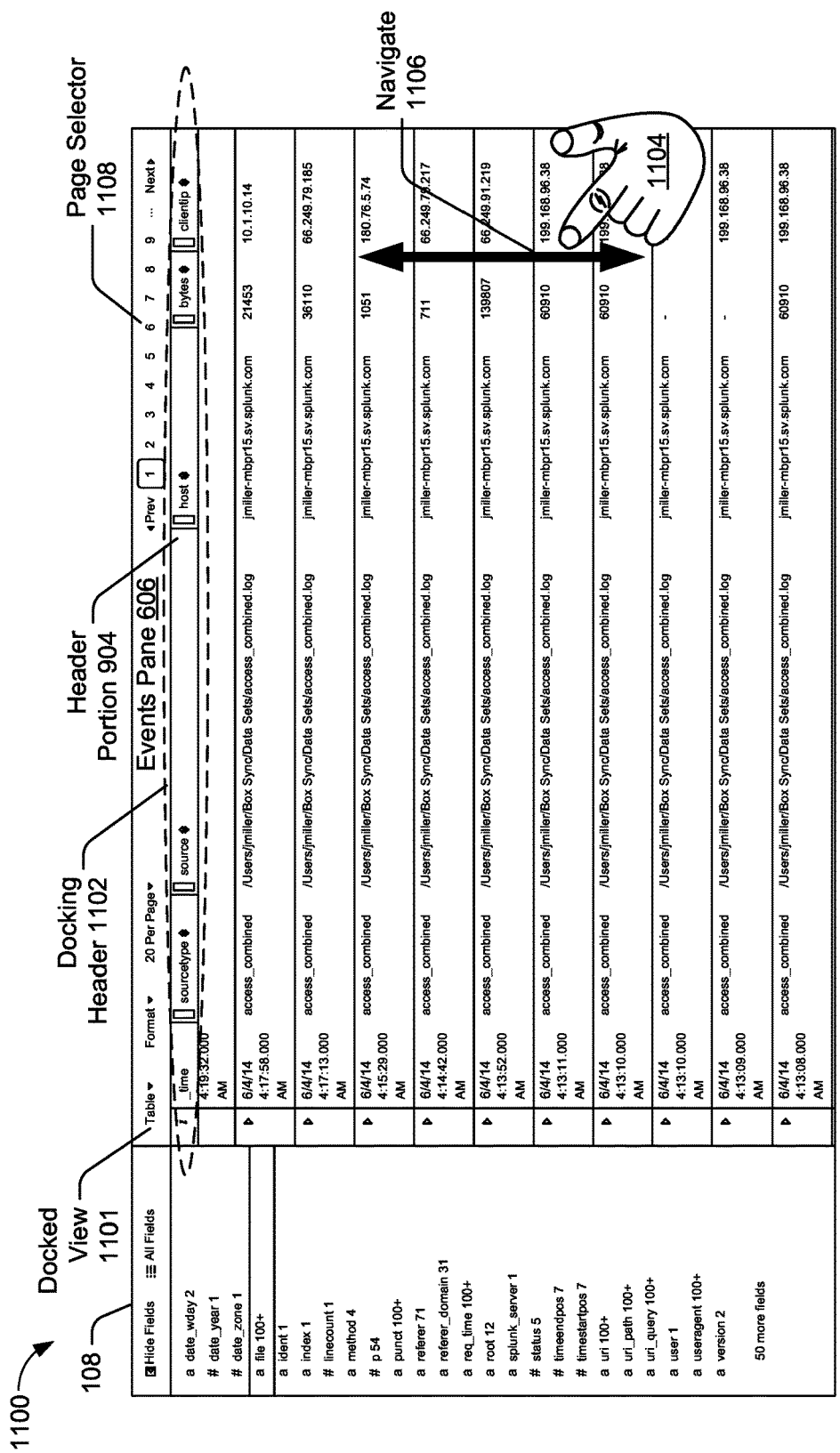
FIG. 11 illustrates a docking header for a table view in accordance with one or more implementations.

FIG. 11 illustrates generally at 1100 a docking header for a table view mode that may be employed in accordance with one or more implementations. In this example, the table view 902 as discussed in relation to FIG. 9 is shown in which the field headers 904 are included as part of a docking header 1102. The docking header 1102 is configured to enable a docked view 1101 in which the headers remain visible as different groups of events are accessed via the events pane 606. For example, input 1104 such as touch input, mouse clicks, scrolling, keystrokes or other types of input may be used to navigate 1106 to different pages or portions of the table. A page selector 1108 may also be provided to facilitate navigations to different pages of search results included in the view. The docking header 1102 may be visually fixed at the top of the table. Rows of events may be rendered to scroll underneath the docking header 1102 in implementations in which scrolling is available. In addition or alternatively, operation of the page selector 1108 may cause different portions of the table to appear below the docking header 1102 while the docking header 1102 stays in place.

Moreover, in an implementation, some portions of the search user interface 108 may be collapsed when the docking header 1102 is activated. For instance, comparison of the docked view 1101 with the table view 902 of FIG. 9 reveals that in the example docked view 1101 the field sidebar 608 and event pane 606 are expanded and other portions shown above these elements in FIG. 9 (e.g., search bar 602, search results tab 604, time range picker 603, timeline 605, etc.) are collapsed. Collapsing of some portions enables presentation of additional rows, fields and/or data within the field sidebar 608 and event pane 606.

The docking header 1102 may be activated in various ways. In one approach, the docking header 1102 may dock automatically in response to input to access different rows or pages of results. In addition or alternatively, a control associated with the headers, such as a dock button or icon, may be provided to enable an explicit selection by a user to transition to the docked view 1101. Still further, the docked view 1101 may be provided as another supported view option that may be selectable via an event view selector 802 in accordance with the techniques discussed herein.

Event Limited Field Picker

In one or more implementations, a search user interface 108 such as the example search screen 600 described above may be configured to expose an event limited field picker. As introduced above, the event limited field picker is configured to expose details regarding a corresponding event and include various functionality to perform operations with respect to fields associated with the corresponding event. The operations may include at least selection and deselection of fields as selected fields that are made visible in views of search results. Additional operations may include but are not limited to selecting or deselecting fields for a search query, refining a time period specified for the query, specifying tags for field values pairs, setting query constraints with respect to fields, and initiating custom actions, to name a few examples . . . . As noted, any suitable user interface instrumentality may be employed to provide access to and launch an event limited field picker for a corresponding event, examples of which include but are not limited to a toggle control, a button, selectable text, an icon, and so forth.

Generally, the event limited field picker may be configured to provide a filtered view of fields that corresponds to fields available for a selected event. The event limited field picker may be employed with any of the various example views of events discussed herein, such as raw view, list view, or table view. In one approach, an event limited field picker toggle 906 (or other user interface instrumentality) may be exposed in association with each individual event in views presented within an events pane 606. When the event limited field picker is launched for a selected event, detail information for the selected event may be exposed.

In an implementation, the event limited field picker provides at least a list of fields associated with a selected event along with suitable user interface instrumentalities operable to select and deselect fields to incorporate into search criteria for a search query. For example, the event limited field picker may be configured to expose a toggle control in association with each event in the view of the events. Each of the toggle controls may be operable to launch the event limited field picker using field data filtered for a corresponding event.

In other words, the event limited field picker is configured to show fields associated with the selected event and enable selections to designate which of the fields are displayed in a view of the events. Selection or deselection of the fields via the event limited field picker may cause setting of the visibility of fields in various views of event data that may be accessible via the search user interface. Visibility of fields may be set with respect to a search results obtained via the search user interface. In an implementation, visibility parameters for fields are set based on selections made via the event limited field picker and views are updated accordingly. This may occur without having the requery the server to obtain updated a search results. In addition or alternatively, selections/deselections of one or more fields via the picker may result in a modification of the search criteria in which case indications of the settings for the one or more fields may be communicated to the server to cause updating of search results by the service accordingly.

In addition to listing of fields corresponding to the selected event, other detail information for the fields may be exposed via the event limited field picker. For example, the event limited field picker may be configured to display a representation of the event data 806 (e.g., as shown in list view 804 or raw view 1002) for a selected event. Moreover, the event limited field picker may be configured to display a representation of field data 808 (e.g., as shown in list view 804 or table view 902) including field values for one or more fields associated with a selected event.

The event limited field picker may be accessible from within an events pane of the search user interface to show the filtered view of fields associated with a selected event. The event limited field picker may also be accessible from a menu item, sidebar, or other representation of individual events provided by the search user interface. The filtered view may be configured to indicate fields that are already selected and other fields associated with the selected event that are available for selection (e.g., fields returned by the query that are not currently selected). For example, the events may be visually divided into a list of selected events and a list of other events using text headers, lines, boxes or other elements.

Further, the event limited field picker may be configured to provide various functionality to perform operations with respect to fields associated with a corresponding event. The operations made available via the event limited field picker may include but are not limited to one or more of making selections to select or deselect fields for a search query, refining a time period specified for a search query, specifying tags for field-values pairs, and/or setting query constraints with respect to fields.

In one particular example, controls associated with each individual field may be configured to launch a drilldown menu with options to refine the search criteria for an active query. Example options include but are not limited to selections to include the individual field in the query, exclude the individual field in the query, or launch a new search using the individual field. The query, search results, and corresponding views may be automatically updated based on selections made via the drilldown menu. In another example, the event limited field picker includes controls associated with each selected field selectable to define a tag for a field-value pair. The tags may then be used to refer to the field-value pair in search queries, label instances of the field-value pair recognized in search results and events, or otherwise make use of a field and particular value in combination. Further details and examples regarding aspects of event limited field picker and techniques to select fields are discussed in relation to example search user interfaces represented in FIGS. 12 to 16.

Figure 12:
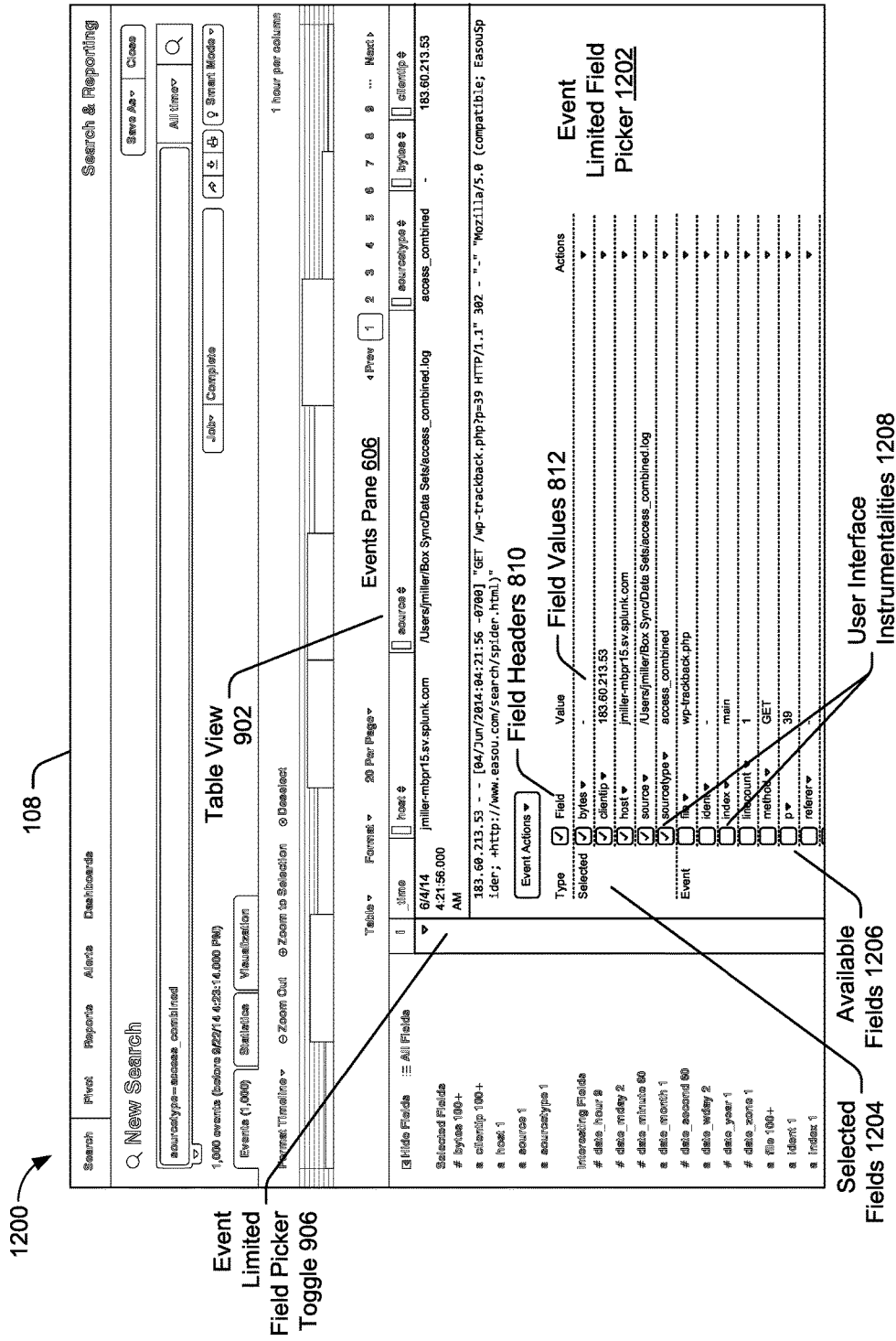
FIG. 12 illustrates a search user interface having an event limited field picker in a table view mode in accordance with one or more implementations.

FIG. 12 illustrates generally at 1200 a search user interface 108 having an event limited field picker 1202 in a table view 902 in accordance with one or more implementations. In this example, an event limited field picker toggle 906 as discussed in relation to FIG. 9 is shown that is operable to selectively expose or collapse the event limited field picker 1202 for a corresponding event. For instance, selection of the toggle for a particular event to launch the picker may cause an expansion of the row for the event and concealment of rows for other events. The event limited field picker 1202 is then revealed within the expanded portion in the event pane 606. The selection may also cause "modalization" of the events pane 606 and "locking-out" of other portions of the search user interface as discussed in greater detail below. Subsequent selection of the toggle to close the picker may cause a switch back to the former view. Operation of the event limited field picker toggle 906 to selectively launch and close to picker is illustrated by comparison of the different example views shown in FIGS. 9 and 12.

Generally speaking, a client may obtain input indicative of selected fields via the event limited field picker 1202. In response, the client may reconfigure and render the view of events to include selected fields and/or communicate indications of the selected fields to a service to cause operations by the service to requery the data, update search results, and/or configure the search user interface to output the updated search results. In one or more implementations, the client may operate to process search results obtained from the server to set visibility of fields in accordance with selection made via the event limited field picker 1202. Selected fields may then be shown in location where field data 808 is exposed and deselected fields may be hidden.

In one or more implementations, the service may perform various operations to facilitate transitions to expose updated views responsive to receiving indications of selected fields. As noted, searches performed by the service may involve applying a late binding schema, which uses one or more extraction rules reflected by the search criteria. In this context, selection of the fields via the event limited field picker and/or other functionality accessible via the field picker may cause modification of the search criteria to specify new and/or updated extraction rules. In response to indications provided by the client regarding the modification of search criteria, the service may be configured to ascertain the extraction rules corresponding to the one or more fields that are selected. In one approach, the extraction rules may be included with and obtained from the indications communicated by the client. In addition or alternatively, the service may include or otherwise make use of a library of extraction rules (e.g., rule base 406) that correspond to fields indicated in the search criteria by the client. In this case, the service may operate to look-up extraction rules for at least some selected fields from the library. Then, the service may reapply the late binding schema to extract events that match the modified search criteria using the ascertained extraction rules. A response that incorporates updated search results based on application of the late binding schema may then be communicated back to the client to facilitate generation of an updated view. This may be accomplished by the service sending search results to the client effective to enable the client computing device to form the updated view (e.g., a view that includes fields/field data in accordance with selection made via the event limited field picker). In addition or alternatively, the service may configure at least a portion of the view on the server side and communicate data effective to enable the client to expose the view on the client side.

In the example of FIG. 12, the event limited field picker 1202 is configured to represent both selected fields 1204 and available fields 1206 as mentioned previously. Field data 808 including one or both of field headers 810 and field values 812 may be included in the representation, such as in a list having fields and value columns as shown. Additionally, user interface instrumentalities 1208 in the form of check boxes (or other controls) may be provided in connection with each individual field. The check boxes or other suitable controls may be used to enable selection and deselection of individual fields in accordance with techniques discussed herein. The fields represented in the event limited field picker 1202 are filtered or "limited" such that the event limited field picker 1202 displays a list of fields that are relevant to the selected event. Accordingly, the fields shown by the event limited field picker 1202 in connection with different events may be different.

Figure 13:
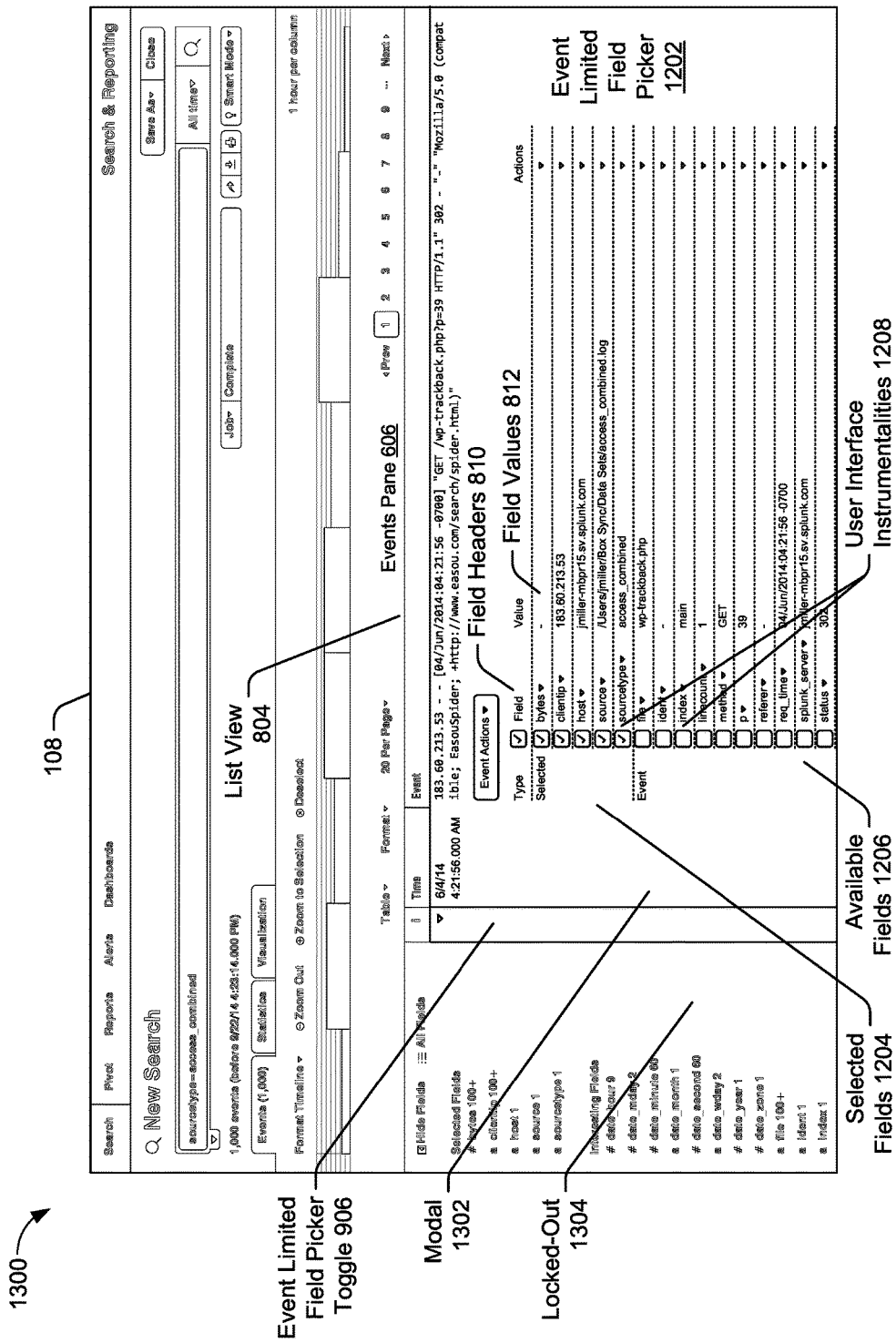
FIG. 13 illustrates a search user interface having an event limited field picker in a list view in accordance with one or more implementations.

FIG. 13 illustrates generally at 1300 a search user interface 108 having an event limited field picker 1202 in a list view 804 in accordance with one or more implementations. The example of FIG. 13 is similar to the example of FIG. 12 just discussed, except that the event limited field picker 1202 is launched from a list view as in FIG. 8 rather than the table view if FIG. 9. More generally, an event limited field picker 1202 as described herein may be made accessible in any suitable way in connection with a list of individual events and/or representations of individual events exposed within a search user interface 108.

Modalization

The examples depicted in FIGS. 12 and 13 additionally illustrate the features of modalization that may be employed in one or more implementations of a search user interface 108. Although aspects of modalization are discussed in relation to the event limited field picker 1202, modalization as described herein is generally applicable to various different views of event data, user interface portions, and functionality that are accessible via a search user interface 108 of which the event limited field picker 1202 is but one illustrative example.

In general, modalization in the context of the example search user interfaces 108 and techniques discussed herein involves entering a mode in which at least one portion of the user interface (e.g., a pane, pop-up window, frame, tool bar, menu, etc.) operates as a modal element and other portions of the user interface are "locked-out". In this mode, extended interaction with data presented via the modal element may occur. At the same time, the locked-out portions may be deactivated such that these portion may not be usable while another portion is modalized and/or processing for the locked-out portions may be stopped or paused.

For example, a rendered page, picker, pop-up box other element associated with view of events via a search user interface 108 may be modalized, in which case other portions of the search user interface 108 may become locked-out until interaction with the modal element concludes (e.g., the search bar 602, fields sidebar 608, time range picker 603, search results tabs 604, etc.). In the case of an on-going active, real-time search, modalizing may cause a pause in the rendering of search results. The search may continue to, but the results are not updated via the events pane so that the user is able to interact with data via the modal element, without worrying about intervening changes that may occur due to the on-going search. For instance, a user may interact to sort or rearrange events in a table view 902 in which case the events pane 606 may be modalized. Here, modalization prevents newly obtained results from coming in the table during the user activity, which could interfere with what the user is trying to accomplish.

Additionally, modalization of an element may enable various kinds of interaction that may not be possible while the search results continue to updating. For example, modalization may provide a static view of events, fields, and/or other data that may be review for an extended period of time without the data changing. Moreover, copy, paste, sort, and rearrange operation for a table or list of data may be made available in connection with a modal element. In addition or alternatively, various different action with respect to event data may be made available in connection with a modal element. For instance, options for event-based actions may be exposed via the modal element examples of which include but are not limited to options to build an new event type, define and/or extract new fields, show and/or access a source of an event, generate reports, view statistical information, expose visualization of the data, select or deselect fields, add tags for field-value pairs, review fields and field values, compare field values summary stats for a query, perform custom defined actions, and/or other actions.

An example of modalization with respect to the event limited field picker 1202 is represented in FIG. 13. Here, operation of the event limited field picker toggle 906 launches the event limited field picker 1202 as a modal element. A search user interface 108 may be configured to visually represent the modalization. By way of example, the event pane 606 in FIG. 13 is shown as a modal 1302 portion that has different shading/coloration than locked-out 1304 portions. In this example, the locked-out 1304 portions are shaded to deemphasize these portions whereas the modal 1302 portion may remain the same shade/color. Other techniques to distinguish between the active modal element and other portions are also contemplated, such as by visually emphasizing the modal portion 1302 with highlighting, a color change, a border, or other visual clues.

The event pane 606 in FIG. 13 may remain in the modal mode as long as interaction with the event limited field picker 1202 continues and/or until a selection is made to leave the modal mode. For example, selecting the event limited field picker toggle 906 again may cause the event limited field picker 1202 to close and the row to collapse to return to a former view (e.g., list view 804 in the example of FIG. 13). Additionally, this selection switch out of the modal mode, which may reactivate the locked-out 1304 portions and restart rendering of search results for an on-going search. In one or more implementation, a selection within one of the locked-out 1304 portions (e.g., shaded portions in FIG. 13) may be interpreted as an attempt to leave the modal mode in which case the selection may also cause switch out of the modal and back to the former view.

In this context, a selection may be detected to launch an event limited field picker 1202 or other element associated with a search user interface 108 as a modal element. Responsive to the selection, one or more other elements of the search user interface 108 may be locked-out and rendering off search results within the user interface may be paused.

Figure 14:
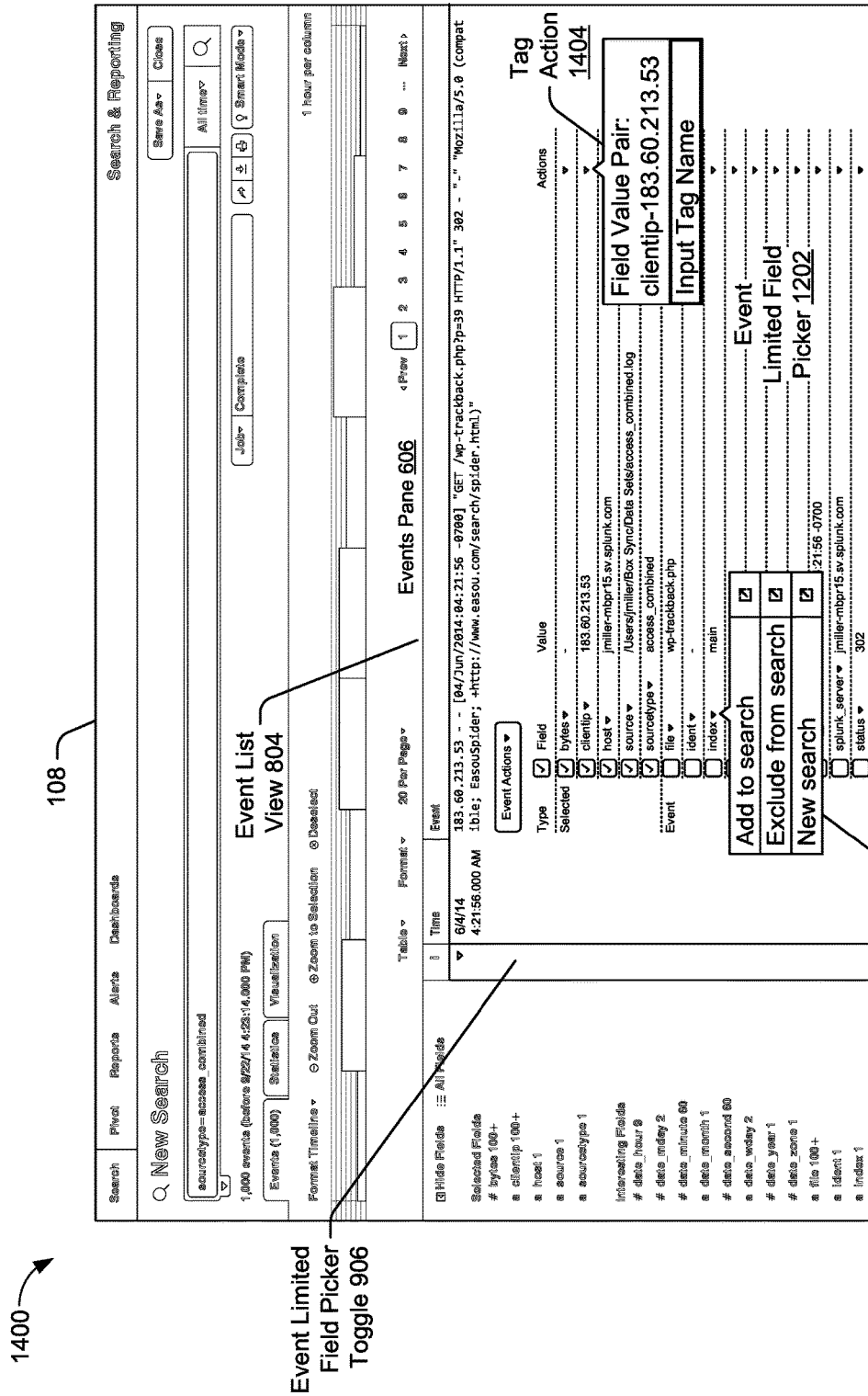
FIG. 14 illustrates some example operations accessible via an event limited field picker in accordance with one or more implementations.

FIG. 14 illustrates generally at 1400 some example operations accessible via an event limited field picker 1202 in accordance with one or more implementations. In particular, a drilldown menu 1402 is depicted that may be accessible via controls associated with events in the event limited field picker 1202. In this example, the drilldown menu 1402 is configured as a drop down or pop-up box that is exposed responsive to selection of toggle controls associated with individual fields. As mentioned previously, the drilldown menu 1402 may provide options to refine the search criteria for an active query. Example options include but are not limited to selections to add the individual field in the query, exclude the individual field in the query, or launch a new search using the individual field, as represented in FIG. 14. The query, search results, and corresponding views may be automatically updated based on selections made via the drilldown menu 1404 or other field selection functionality. By way of example and not limitation, a search query that is updated using a drilldown menu 1404, event limited field picker 1202, or other field selection functionality to select a field and/or value combinations may be listed with the updates in a search bar 602 as well as in other views/location in which representations of a search query are made available.

The event limited field picker 1202 also includes a tag action control 1404 associated with each field. The tag action control 1404 is selectable to define a tag for a field-value pair. For example, tag action control 1404 may be configured to expose an input box (as shown), dialog, or other mechanism that enables definition of a tag based on a corresponding field-value pair. In this example, the field-value pair is a particular combination of the field "clientip" and value "183.60.213.53." The tag action control 1404 enables input of a tag name to associate with the field-value pair. Tags that are defined via a tag action control 1404 or otherwise may be used to refer to field-value pairs in search queries, label instances of field-value pairs using the tag name, or otherwise make use of a field and particular value in combination.

The event limited field picker 1202 as described herein represents one of many ways in which a search user interface may be configured to enable selection and deselection of fields for different views. Fields may also be selected by way of an all fields list 805 that may be accessible via a fields sidebar 608 as discussed previously. The all fields list 805 may be configured as a picker that is similar to the associated event limited field picker 1202 except that selections may be made for fields across different events rather than in relation to one selected event. In addition or alternatively, interaction with fields represented in the fields sidebar 608 may also be employed to make selections regarding various fields. For example, a pop-up field picker for a field selected via the fields sidebar 608 may be exposed responsive to selection of the field, details of which are discussed in relation to the following figures.

Figure 15:
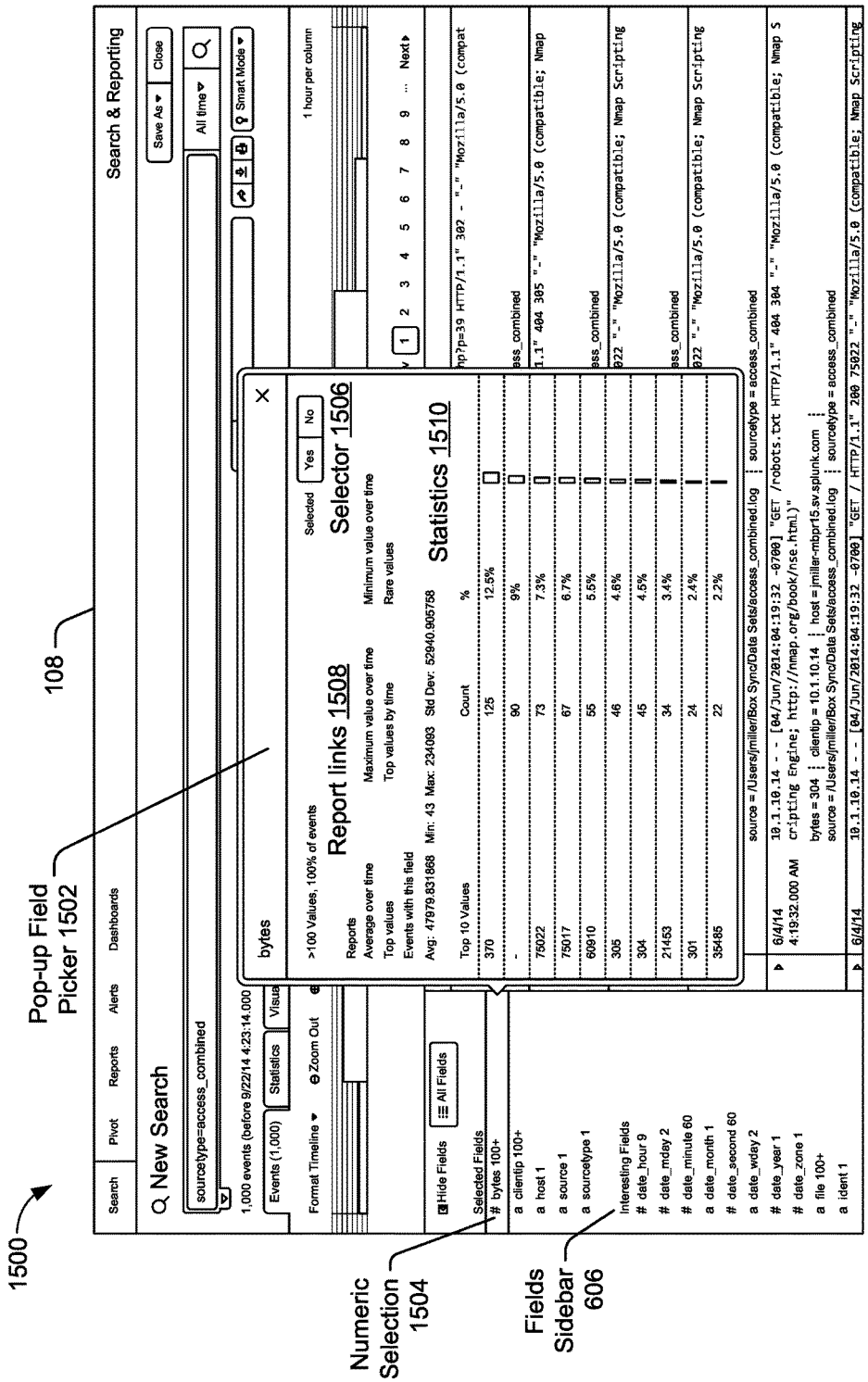
FIG. 15 illustrates an example pop-up field picker in accordance with one or more implementations.

For instance, FIG. 15 illustrates generally at 1500 an example pop-up field picker 1502 in accordance with one or more implementations. The pop-up field picker 1502 may be configured as a pop-up or slide out window configured to show details regarding a selected field. Various details may be presented via the pop-up field picker 1502 and the information that is shown may vary based on the type of field selected. For example, different details may be shown for numeric fields and string fields. The example of FIG. 15 represents a numeric selection 1504 of a "bytes" field (e.g., bytes has numeric values). Here, the pop-up field picker 1502 includes a selector 1506 to designate the field as being selected or not selected. The selector 1506 may be provided using any suitable user interface instrumentalities. By way of example, the selector 1506 in FIG. 15 is configured as yes and no buttons that may be used to designate the bytes field as selected or not selected. Details shown regarding the selected field may include reports links 1508 that may be selected to create reports related to the selected field and statistics 1510 regarding instances of the field and/or field values in event data for a current query. For this numeric field, statistical values for average, minimum, maximum, standard deviation, and so forth may be presented. Additionally, a top values list configured to indicate and/or visually represent occurrence of different values may be shown, such as the "top 10 values" table shown in FIG. 15.

Figure 16:
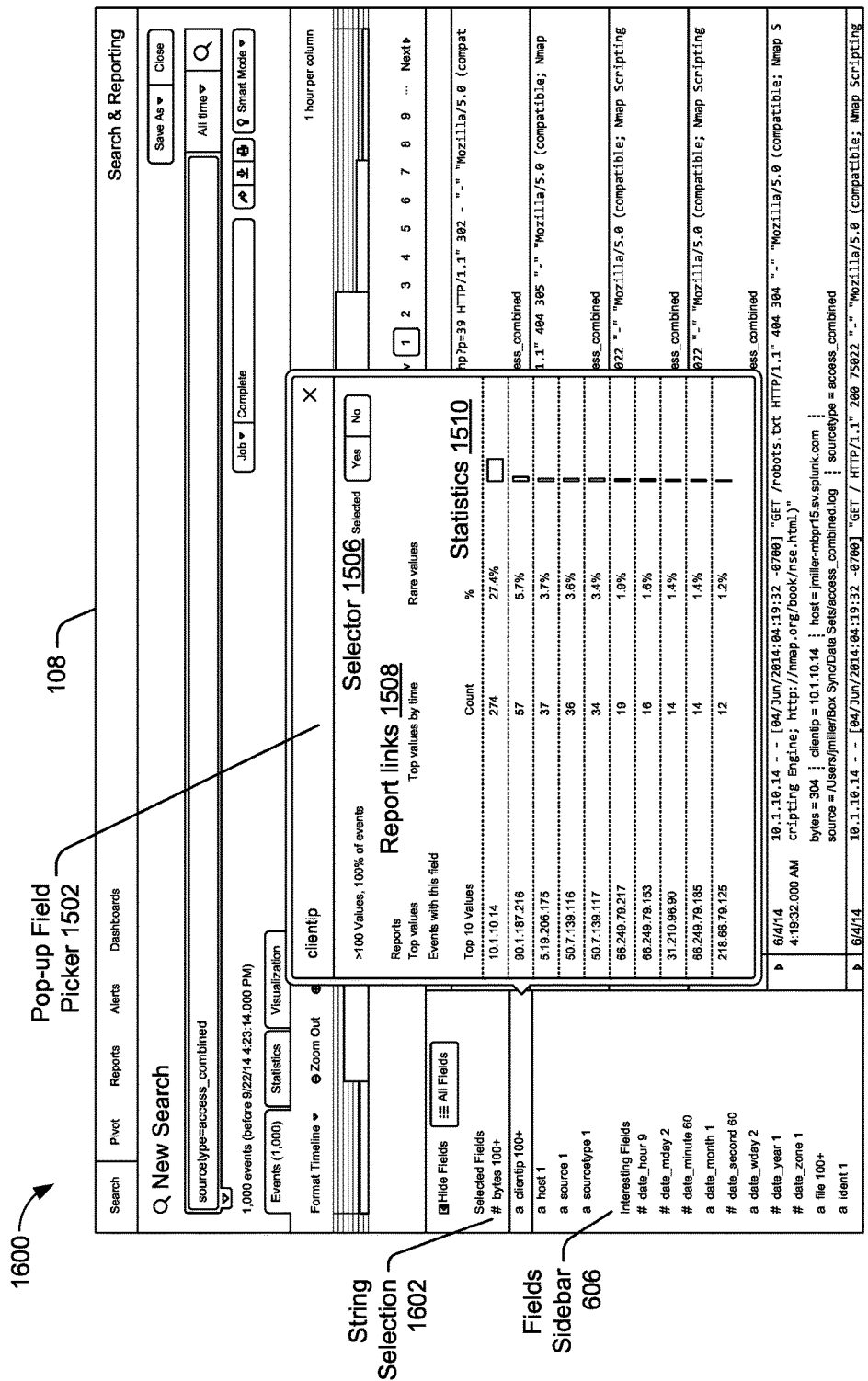
FIG. 16 illustrates another example pop-up field picker in accordance with one or more implementations.

FIG. 16 illustrates another example pop-up field picker 1502 in accordance with one or more implementations. The example of FIG. 16 represents a string selection 1504 of a "clientip" field (e.g., clientip has string values). In this case, the statistics 1510 portion of the pop-up field picker 1502 may be adapted based on the field type. For example, statistical values associated with numeric fields are omitted in the example of FIG. 16 for the string values, since these values may not be relevant. Other adaptations based on field type are also contemplated such as showing different report links 1508, providing different visualizations, rearranging the layout of data shown in the pop-up field picker 1502, and so forth.

Having considered the foregoing discussion of example user interfaces and details, consider now a discussion of some example procedures in accordance with one more implementations Example Procedures This section described illustrative procedures that may be implemented utilizing the previously described systems and devices. Aspects of the procedures described below may be implemented in hardware, firmware, or software, or a combination thereof. The procedures below are shown as a set of blocks that specify operations performed by one or more devices and are not necessarily limited to the orders shown for performing the operations by the respective blocks. In portions of the following discussion, reference may be made to the example components, devices, details and examples of FIGS. 1-16.

Figure 17:
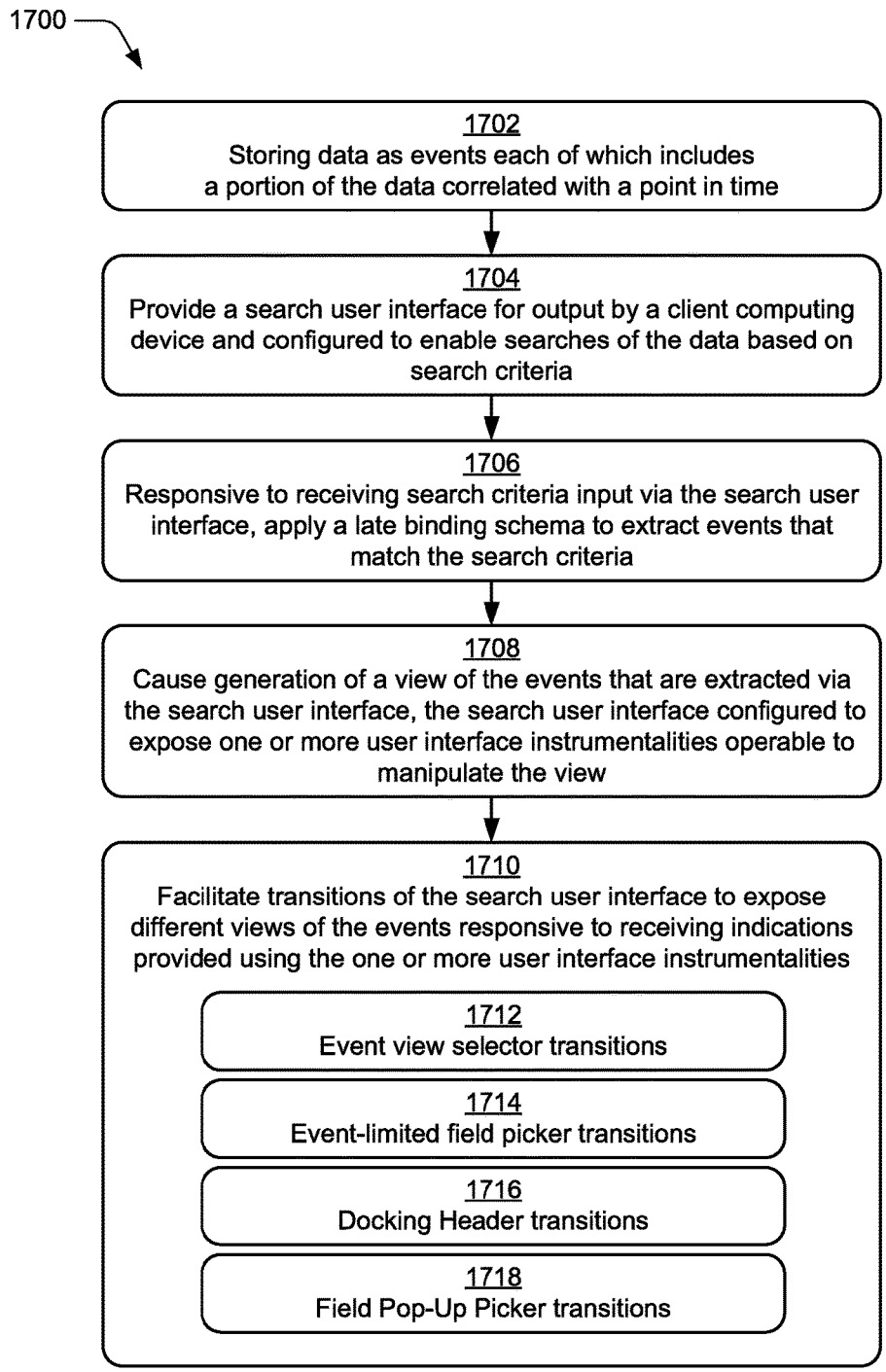
FIG. 17 is a flow diagram depicting a procedure in which a service facilitate transitions between views based on selections made via a search user interface.

FIG. 17 is a flow diagram depicting a procedure 1700 in an example implementation in which a service facilitate transitions between views based on selections made via a search user interface. In one or more examples, the procedure may be performed via a search service that may be implemented via system 100 as described herein to enable searches of event data by client application modules 106 executed via client computing devices.

Data is stored as events each of which includes a portion of the data correlated with a point in time (block 1702). For example, a system 100 and/or corresponding service may obtain, process, index, and store data in one or more data stores 103 in the manner described in this document. A search user interface is provided for output by a client computing device and configured to enable searches of the data based on search criteria (block 1704). Various examples of search user interfaces 108 configured to provide functionality to perform searches and interact with search results are discussed throughout this document. Responsive to receiving search criteria input via the search user interface, a late binding schema is applied to extract events that match the search criteria (block 1706). As noted the late binding schema may reflect extraction rules that are ascertained directly from search criteria provided by clients or based on indications of fields and parameters included with the search criteria. The late binding schema is applied at search time in response to a search query to extract field data, as opposed to technique in which data is parsed into pre-defined items during data ingestion.

Then, the search service may cause generation of a view of the events that are extracted via the search user interface is caused, the search user interface configured to expose one or more user interface instrumentalities operable to manipulate the view (block 1708) and transitions of the search user interface to expose different views of the events are facilitated responsive to receiving indications provided using the one or more user interface instrumentalities (block 1710).

For example, the search service may conduct searches based upon input obtained to specify views, fields, time constraints, computations, aggregations, and/or other parameters for search queries in accordance with selection made via kinds of user interface instrumentalities. Generally, input generated via the user interface instrumentalities may be used to modify a current search and cause corresponding manipulations of the underlying data and/or view of the data. Various kinds of user interface instrumentalities and corresponding transitions are contemplated, including but not limited to the examples discussed in relation to FIGS. 1 to 16 above.

By way of example and not limitation, the transitions may include one or various combinations of event view selector transitions 1712 from one view to another based on selections made via an event view selector 802, event limited field picker transitions 1714 to change fields include in search queries and results based on selections made via an event limited field picker 1202, docking header transitions 1716 associated with switching between a docked view and other views, and/or pop-up field picker transitions 1718 based on selections made via a pop-up field picker 1502, details regarding each of which are described in the preceding discussion of examples of FIGS. 1 to 16. Other types of transitions that are triggered using various user interface instrumentalities are also contemplated.

Figure 18:
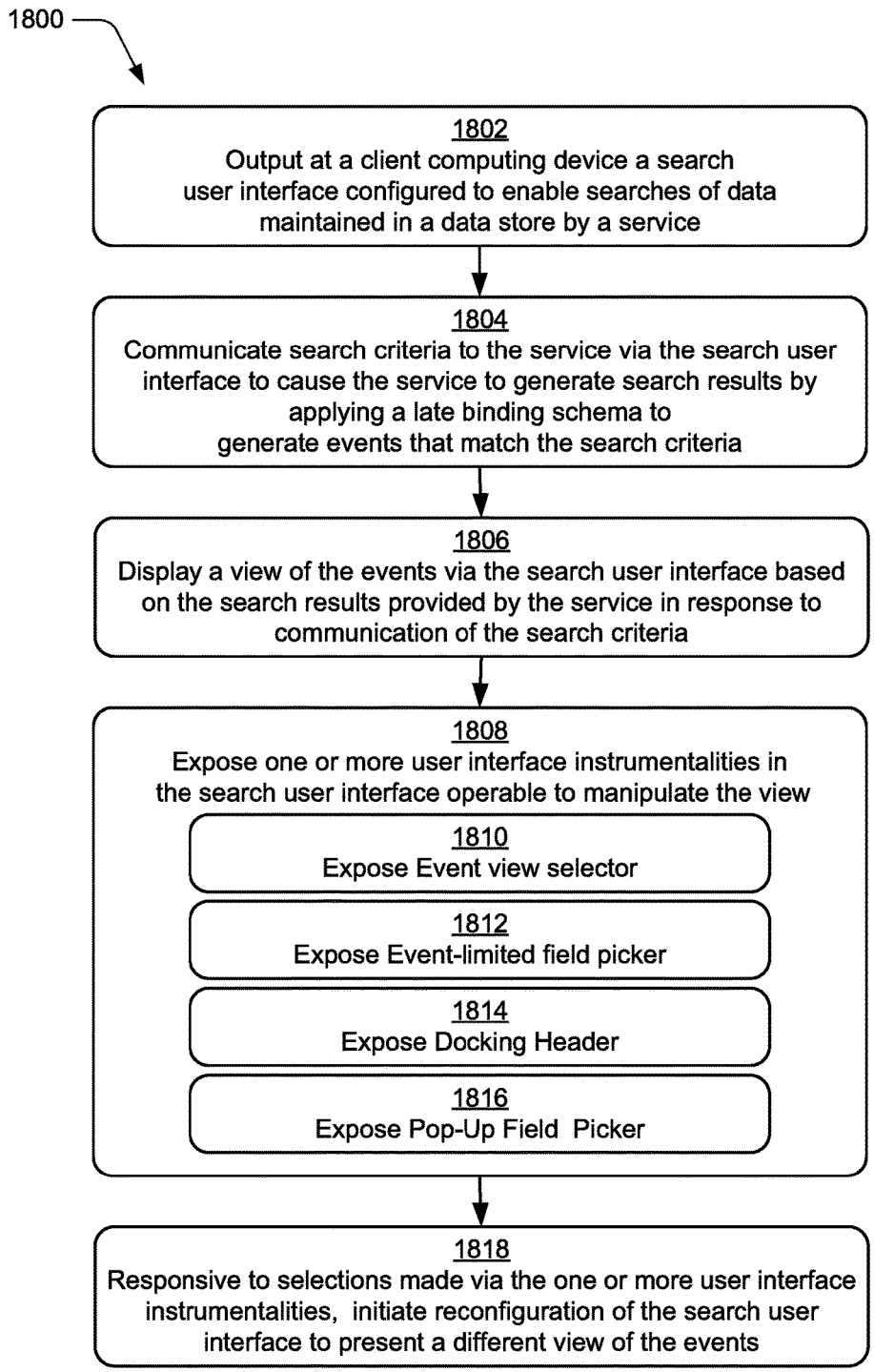
FIG. 18 is a flow diagram depicting a procedure in which a client exposes a search user interface having one or more user interface instrumentalities operable to manipulate a view of event data presented via the search user interface.

FIG. 18 is a flow diagram depicting a procedure 1800 in an example implementation in which a client exposes a search user interface having one or more user interface instrumentalities operable to manipulate a view of event data presented via the search user interface. In one or more examples, the procedure may be performed via client application module 106 executed via client computing devices. As noted previously, the client application module 106 may output a search user interface 108, which may enable interaction with a search service implemented via system 100 or otherwise.

A search user interface configured to enable searches of data maintained in a data store by a service is output at a client computing device (block 1802). Various different search user interfaces are contemplated, such as the example search user interfaces 108 discussed throughout this document. Search criteria communicate to the service via the search user interface to cause the service to generate search results by applying a late binding schema to generate events that match the search criteria (block 1804). For example, a search query may be specified via search criteria input via a search bar 602 of a search user interface 108 as discussed herein. Time constraints for the search query may also be specified using a time range picker 603, as additional search criteria, or otherwise. The search query may cause operation by the search service to conduct the search by applying a late binding schema, generate search results, and provide a response back to the client.

Then, a view of the events via the search user interface is displayed based on the search results provided by the service in response to communication of the search criteria (block 1806). Various different views mentioned herein may be displayed to provide a representation of event data.

One or more user interface instrumentalities are exposed in the search user interface operable to manipulate the view (block 1808). Various kinds of user interface instrumentalities may be exposed in a search user interface 108 to enable transitions between views and/or manipulations of the views. The instrumentalities may include but not limited to the examples discussed in relation to FIGS. 1 to 16 above. In particular, exposure of user interface instrumentalities may include exposing one or a combination of an event view selector (block 1810), exposing an event limited field picker (block 1812), exposing a docking header (block 1814), and/or exposing a pop-up field picker (block 1812), each of which is described in detail in the foregoing description.

Responsive to selections made via the one or more user interface instrumentalities, reconfiguration of the search user interface is initiated to present a different view of the events (block 1818). For example, various interaction between a client application module 106 and a search service may occur in response to selections made via the different instrumentalities described herein. The selections may cause an update to search criteria, view selections, field selections and so forth. The client application module 106 may communicate indications regarding these selections and other parameters to the search service effective to cause the search service to conduct an updated search and provide a response back to the client. The response may include updated search results, field data, views, and/or pre-configured user interface portions that enable to client to form and/or output and update view via the search user interface 108.

Figure 19:
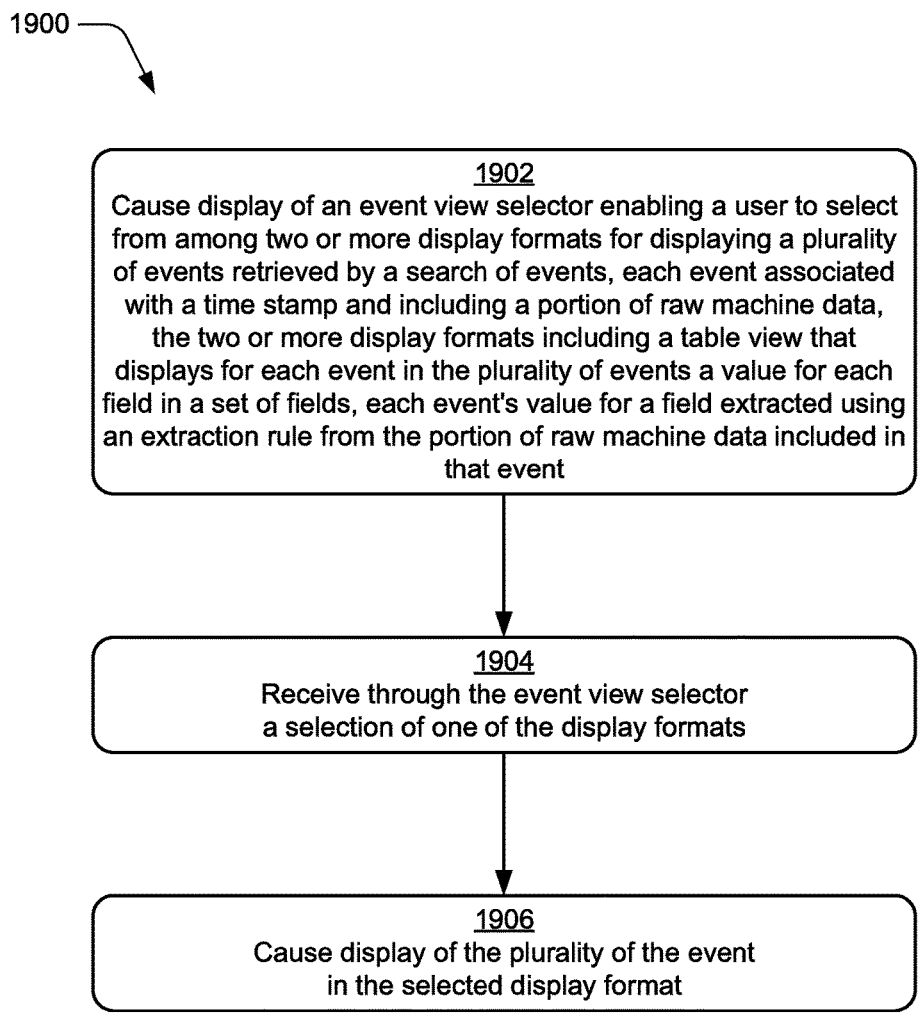
FIG. 19 is a flow diagram depicting a procedure in which an event view selector is exposed in accordance with one or more implementations.

FIG. 19 is a flow diagram depicting a procedure in which an event view selector is exposed in accordance with one or more implementations. Aspects of the procedure may be performed via one or more clients, one or more servers, and/or in a distributed manner using a combination of devices. Display of an event view selector is caused that enables a user to select from among two or more display formats for displaying a plurality of events retrieved by a search of events, each event associated with a time stamp and including a portion of raw machine data, the two or more display formats including a table view that displays for each event in the plurality of events a value for each field in a set of fields, each event's value for a field extracted using an extraction rule from the portion of raw machine data included in that event (block 1902). A selection of one of the display formats is received through the event view selector (block 1904). Display of the plurality of the event in the selected display format is caused (block 1906).

Various different display formats or views are contemplated examples of which were previously discussed previously. For example the display formats may include a raw view, list view, and table view as discussed herein. Raw view may be configured to represent the portions of the raw machine data for events in a raw format and list view may be configured to represent the portion of raw machine data for events in a list in conjunction with the values for each field that are extracted. The table view is configured to represent values for different fields in different columns and different events in different rows. Moreover, the table view is configured to display the values that are extracted for each field in the set of fields without concurrently display of the portions of raw machine data for the events.

The set of fields may include fields that are selected by a user via interaction with user instrumentalities accessible via the user interface to enable selection of fields. These may include the event limited field picker, all fields picker, and pop-up field picker described herein as well as other suitable selection mechanisms. One or more of the fields in the set of fields may also be preconfigured for inclusion in the set of fields. For example, default setting may specify particular fields that are selected for display in table view, list view and/or other view in which field data is exposed. Some fields may be selected automatically by the system based on field type, such as timestamp, source and/or other index fields. Thus, the set of fields may include a combination of user selected fields and fields preconfigured for inclusion.

It is also noted that the event view selector may be employed either before or after results are rendered in the user interface to specify a display format to use for the event data. Thus, in one approach, causing display of the selected view may involve switching from an initial or prior view in which the results are presented to the selected view. Here, the plurality of the events may be displayed in a first display format responsive to a search of events. Then a transition may occur from the first display format to the selected display format based on a selection via the event view selector. In another approach, he plurality of the events are displayed in the selected display format responsive to interaction with the event view selector and without presenting the plurality of the events in a different view prior to the interaction with the event view selector. Various other aspects discussed in relation to FIGS. 1-18 may also be incorporated in the example procedure 1900 of FIG. 19.

Figure 20:
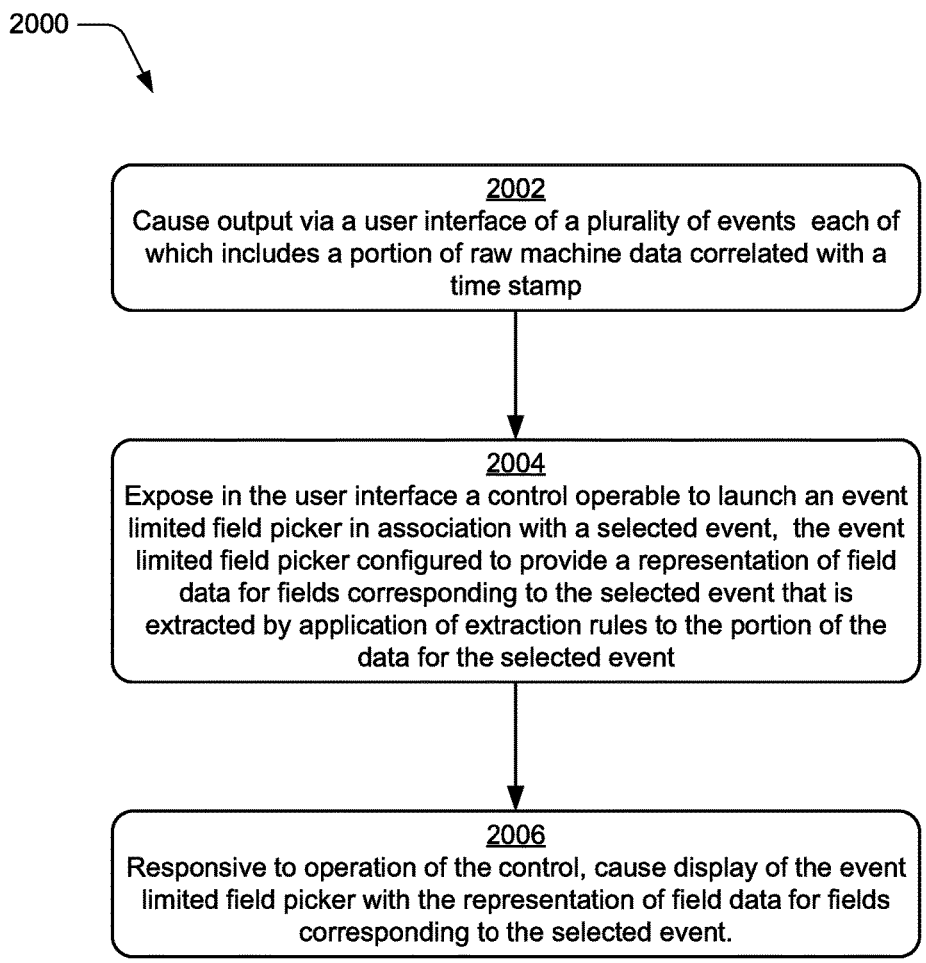
FIG. 20 is a flow diagram depicting a procedure in which an event limited field picker is exposed in accordance with one or more implementations

FIG. 20 is a flow diagram depicting a procedure 2000 in which an event limited field picker is exposed in accordance with one or more implementations. Aspects of the procedure may be performed via one or more clients, one or more servers, and/or in a distributed manner using a combination of devices.

Output via a user interface of a plurality of events each of which includes a portion of raw machine data correlated with a time stamp is caused (block 2002)

A control operable to launch an event limited field picker in association with a selected event is exposed in the search user interface, the event limited field picker configured to provide a representation of field data for fields corresponding to the selected event that is extracted by application of extraction rules to the portion of the data for the selected event (block 2004). Responsive to operation of the control, display of the event limited field picker with the representation of field data for fields corresponding to the selected event is caused (block 2006). Various controls that may be employed to launch an event limited field picker are contemplated examples of which have been discussed in this document. For example, a toggle control may be exposed in association with each event in a view of the events as discussed previously. The toggle controls are operable to launch the event limited field picker using field data that is filtered for a corresponding event (e.g., limited to the event).

The representation of field data for fields corresponding to the selected event includes field headers and corresponding field values that are extracted by application of extraction rules. For example, a list of field headers may be shown in a first column with corresponding field values that are extracted by application of extraction rules shown in a second column as shown in FIGS. 12 and 13. The event limited field picker may additionally display a representation of the portion of the raw machine data for the selected event. In addition or alternatively, a list of fields associated with a selected event may be shown along with user interface instrumentalities, such as check boxes, that are operable to select and deselect fields. In response to receiving an indication of one or more fields selected via the event limited field picker, visibility may be set for one or more fields in different views of the events in accordance with the indication. Selected fields and values may then be presented in table view, list view other views. The event limited field may be configured to indicate fields that are already selected and other fields associated with the selected event that are available for selection, using the check boxes or other visual indications. As discussed herein, the event limited field picker may also provide a representation of statistics for the plurality of events as a whole in connection with the fields and field values for the selected event. This enables a user to compare field values for the selected event with the statistics for all of the events returned in a query. Various other aspects discussed in relation to FIGS. 1-18 may also be incorporated in the example procedure 2000 of FIG. 20.

In addition to the foregoing details and examples, implementations of methods, computer readable media and systems may involve display of a field information panel, examples of which include the event-limited field and pop-up field picker, and other user interface elements and instrumentalities discussed previously. Implementations may include causing display of a plurality of events, each event associated with a time stamp and including a portion of raw machine data; receiving a selection of a particular event; and based on receiving the selection of the particular event, causing display of a field information panel that displays identifiers for each field in a set of fields having corresponding values for the particular event, each field defined by an extraction rule that extracts the corresponding value for the field from the portion of raw machine data in that particular event.

The identifier for a field may be a name that can be used to reference the field in a search query. The field information panel may display the corresponding value for each field for which an identifier is displayed in the panel. The field information panel may also display a statistic based on the corresponding value for each field for which an identifier is displayed in the panel. Further the field information panel may display a statistic based on the corresponding value for each field for which an identifier is displayed in the panel, with the statistic representing a percentage of events that have the corresponding value for the field relative to a set of events that were retrieved by a search query and that include at least the plurality of displayed events. In an additional example, the field information panel may display both the corresponding value for each field for which an identifier is displayed in the panel and a statistic based on the corresponding value. Further, the field information panel may display a portion of raw machine data included in the selected event. In addition or alternatively, the field information panel may display both the corresponding value for each field for which an identifier is displayed in the panel and the portion of raw machine data included in the selected event.

In other examples, the plurality of displayed events may be included in a set of events retrieved by a search query. In this case implementations may further include causing display in the field information panel of the corresponding value for each field for which an identifier is displayed in the panel; receiving a selection corresponding to a particular field for which an identifier is displayed in the panel; based on receiving the selection corresponding to the particular field, identifying a subset of the set of events that have a same value for the particular field as the selected particular event; and causing display of the subset of the set of events In other examples, the plurality of displayed events is included in a set of events retrieved by a search query. In this case, implementations may further include causing display in the field information panel of the corresponding value for each field for which an identifier is displayed in the panel; receiving a selection corresponding to a particular field for which an identifier is displayed in the panel; based on receiving the selection corresponding to the particular field, identifying a subset of the set of events that have a same value for the particular field as the selected particular event; causing display of the subset of the set of events; causing emphasis of the same value in each event in the displayed subset of the set of events.

Implementations may also include causing display in the field information panel of an interactive element (e.g., check box or a user interface instrumentality) for selecting one or more particular fields associated with the displayed identifiers. In addition, the field information panel may display an interactive element for selecting one or more particular fields associated with the displayed identifiers and receive a selection through the interactive element of one or more particular fields associated with the displayed identifiers. Then, events retrieved using a search query may be displayed in a table format (e.g., table view), the table format including information about values for the displayed events for the selected particular fields.

Additional implementations include causing display in the field information panel of an interactive element for selecting one or more particular fields associated with the displayed identifiers; receiving a selection through the interactive element of one or more particular fields associated with the displayed identifiers; and causing display in a list format of events retrieved using a search query, the list format including for each displayed event information about the values for that event for the selected particular fields.

Implementation may include causing display in the field information panel of an interactive element for selecting one or more particular fields associated with the displayed identifiers; receiving a selection through the interactive element of one or more particular fields associated with the displayed identifiers; and causing display in a list format of events retrieved using a search query, the list format including for each displayed event information about the values for that event for the selected particular fields, the information corresponding to a given event displayed proximate to raw machine data included in the given event.

Still further, implementations may include causing display in the field information panel of an interactive element for selecting one or more particular fields associated with the displayed identifiers; receiving a selection through the interactive element of one or more particular fields associated with the displayed identifiers; and causing display in a second field information panel an identification of the selected one or more fields, the second field information panel displaying additional non-selected fields defined for events retrieved by a search query, the second field information panel displayed concurrently with the events retrieved by the search query.

Further, the portion of raw machine data in at least one of the displayed events may include log data. In addition or alternatively, the portion of raw machine data in at least one of the displayed events may include wire data. In addition or alternatively, the portion of raw machine data in at least one of the displayed events may include unstructured data.

Having considered the foregoing discussion of example user interfaces and procedures, consider now a discussion of an example system and device in accordance with one more implementations.

Example System and Device

Figure 21:
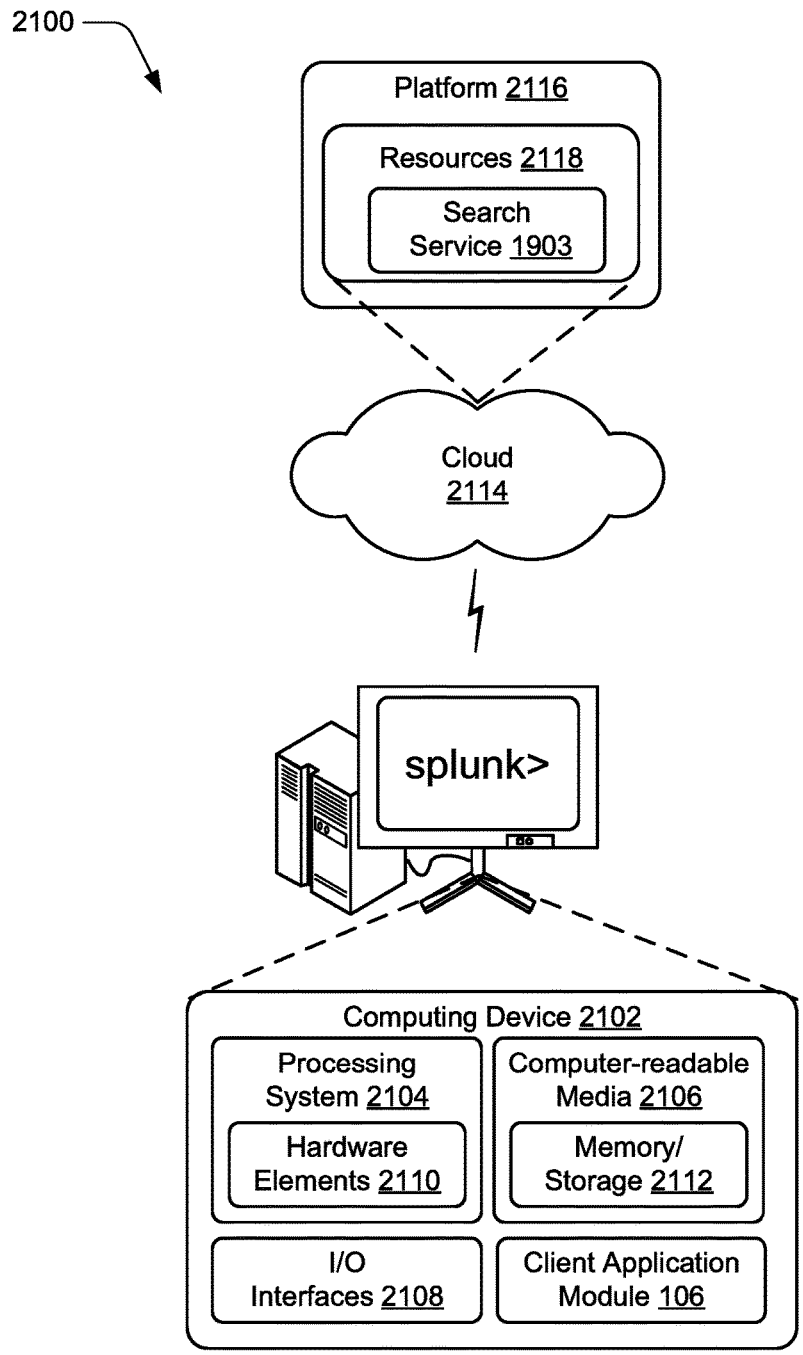
FIG. 21 illustrates an example system including various components of an example device that can be implemented as any type of computing device as described and/or utilize with reference to FIGS. 1-20 to implement aspects of the techniques described herein.

FIG. 21 illustrates an example system generally at 2100 that includes an example computing device 2102 that is representative of one or more computing systems and/or devices that may implement the various techniques described herein. This is illustrated through inclusion of the client application module 106 that is representative of functionality to interact with a search service 2103, e.g., to specify and manage searches using a late-binding schema and events as described above. The computing device 2002 may be, for example, a server of a service provider, a device associated with a client (e.g., a client device), an on-chip system, and/or any other suitable computing device or computing system.

The example computing device 2102 as illustrated includes a processing system 2104, one or more computer-readable media 2106, and one or more I/O interface 2108 that are communicatively coupled, one to another. Although not shown, the computing device 2102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2104 is representative of functionality to perform one or more operations using hardware. Accordingly, the processing system 2104 is illustrated as including hardware element 2110 that may be configured as processors, functional blocks, and so forth. This may include implementation in hardware as an application specific integrated circuit or other logic device formed using one or more semiconductors. The hardware elements 2110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2106 is illustrated as including memory/storage 2112. The memory/storage 2112 represents memory/storage capacity associated with one or more computer-readable media. The memory/storage component 2112 may include volatile media (such as random access memory (RAM)) and/or nonvolatile media (such as read only memory (ROM), Flash memory, optical disks, magnetic disks, and so forth). The memory/storage component 2112 may include fixed media (e.g., RAM, ROM, a fixed hard drive, and so on) as well as removable media (e.g., Flash memory, a removable hard drive, an optical disc, and so forth). The computer-readable media 2106 may be configured in a variety of other ways as further described below.

Input/output interface(s) 2108 are representative of functionality to allow a user to enter commands and information to computing device 2102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2110 and computer-readable media 2106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2110. The computing device 2102 may be configured to implement particular instructions and/or functions corresponding to the software and/or hardware modules. Accordingly, implementation of a module that is executable by the computing device 2102 as software may be achieved at least partially in hardware, e.g., through use of computer-readable storage media and/or hardware elements 2110 of the processing system 2104. The instructions and/or functions may be executable/operable by one or more articles of manufacture (for example, one or more computing devices 2102 and/or processing systems 2104) to implement techniques, modules, and examples described herein.

The techniques described herein may be supported by various configurations of the computing device 2102 and are not limited to the specific examples of the techniques described herein. This functionality may also be implemented all or in part through use of a distributed system, such as over a "cloud" 2114 via a platform 2116 as described below.

The cloud 2114 includes and/or is representative of a platform 2116 for resources 2118. The platform 2116 abstracts underlying functionality of hardware (e.g., servers) and software resources of the cloud 2114. The resources 2118 may include applications and/or data that can be utilized while computer processing is executed on servers that are remote from the computing device 2102. Resources 2118 can also include services provided over the Internet and/or through a subscriber network, such as a cellular or Wi-Fi network.

The platform 2116 may abstract resources and functions to connect the computing device 2102 with other computing devices. The platform 2116 may also serve to abstract scaling of resources to provide a corresponding level of scale to encountered demand for the resources 2118 that are implemented via the platform 2116. Accordingly, in an interconnected device embodiment, implementation of functionality described herein may be distributed throughout the system 2100. For example, the functionality may be implemented in part on the computing device 2102 as well as via the platform 2116 that abstracts the functionality of the cloud 2114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
receiving, from input to a search screen, a search query on events in a data store, each event comprising a time stamp and a portion of machine data that reflects activity in an information technology environment of at least one computing system and is associated with one or more fields, wherein a field is defined by an extraction rule for extracting a sub-portion of text from the portion of machine data in an event by identifying a pattern in the portion of machine data to produce a field value and a field name for the field for the event;
causing display in the search screen of a search results set that is responsive to the receiving of the search query using a raw view of one or more events of a plurality of the events of the search results set in a first display format that displays for at least a first event of the one or more events, the portion of machine data of the first event in a cell, the displayed portion of machine data corresponding to a plurality of field values of the fields of the first event without displaying field names in the cell, wherein the raw view comprises a list of the plurality of the events;
causing display of a graphical display element, that when selected, causes display of the search results set using an alternate view of the one or more events in a second display format, the second display format being a list format or a table format; and
causing a transition in the displayed list in the search screen from the display of the search results set using the raw view of the one or more events in the first display format to the display of the search results set using the alternate view of the one or more events in the second display format based on a user selection of the graphical display element,
wherein the transition causes display of the field values and field names of the fields associated with the first event produced using the extraction rule in the cell in the list of the plurality of the events.

2. The method of claim 1, wherein the transition replaces the displayed portion of machine data in the cell in the list of the plurality of the events with the field values of the first event and field names of the fields.

3. The method of claim 1, wherein the list format displays, for each event, respective field values of selected fields of the event proximate to the portion of machine data of the event.

4. The method of claim 1, further comprising extracting the field values of the fields associated with the first event from the portion of machine data of the first event, each field extracted using the extraction rule that defines the field.

5. The method of claim 1, wherein the first display format displays each event without identifying any field values of fields of the event.

6. The method of claim 1, wherein the extraction rule comprises a regular expression.

7. The method of claim 1, wherein the portion of machine data reflects at least one of security-related or information technology management information of the at least one computing system.

8. The method of claim 1, wherein the portion of machine data of the first event comprises a character string from which multiple ones of the field values are extracted.

9. The method of claim 1, wherein the second display format is the list format that represents the one or more events as a list of rows, each row corresponding to an event of the one or more events and comprising at least some field values of the event.

10. The method of claim 1, wherein the second display format is the list format that represents the one or more events as a list of rows, each row corresponding to an event of the one or more events and comprising a field value of the event and a field name of a field comprising the field value.

11. The method of claim 1, further comprising in the alternate view, receiving a deselection, by the user, of a field of the one or more of the events, and in response to the deselection, causing removal from the display each field value of the deselected field for each event of the one or more events.

12. The method of claim 1, wherein the display of the raw view in the first display format and the display of the alternate view in the second display format each receive the one or more events from a common search results set of the search query.

13. The method of claim 1, wherein the field values are identified in the alternate view based on the fields corresponding to the fields values being selected, by the user, in a fields sidebar displayed with the raw view.

14. The method of claim 1, further comprising performing a search in response to the receiving of the search query, the search applying a late-binding schema to the one or more of the events in which the extraction rule is applied to the one or more of the events to generate the field defined by the extraction rule.

15. The method of claim 1, comprising a fields sidebar displayed with the alternate view, the fields sidebar identifying unselected fields corresponding to the one or more of the events, each unselected field being identified by a respective field name and being selectable, by the user in the fields sidebar, to:
cause respective field values of the unselected field to be identified in the alternate view for each event in the one or more events; and
cause update to the displayed fields sidebar to identify the unselected field as being selected by the user.

16. One or more non-transitory computer-readable storage media comprising instructions that are stored thereon that, responsive to execution by one or more processors, cause the one or more processors to perform operations comprising:
receiving, from input to a search screen, a search query on events in a data store, each event comprising a time stamp and a portion of machine data that reflects activity in an information technology environment of at least one computing system and is associated with one or more fields, wherein a field is defined by an extraction rule for extracting a subportion of text from the portion of machine data in an event by identifying a pattern in the portion of machine data to produce a field value and a field name for the field for the event;
causing display in the search screen of a search results set that is responsive to the receiving of the search query using a raw view of one or more events of a plurality of the events of the search results set in a first display format that displays for at least a first event of the one or more events, the portion of machine data of the first event in a cell, the displayed portion of machine data corresponding to a plurality of field values of the fields of the first event without displaying field names in the cell, wherein the raw view comprises a list of the plurality of the events;
causing display of a graphical display element, that when selected, causes display of the search results set using an alternate view of the one or more events in a second display format, the second display format being a list format or a table format; and
causing a transition in the displayed list in the search screen from the display of the search results set using the raw view of the one or more events in the first display format to the display of the search results set using the alternate view of the one or more events in the second display format based on a user selection of the graphical display element,
wherein the transition causes display of the field values and field names of the fields associated with the first event produced using the extraction rule in the cell in the list of the plurality of the events.

17. The one or more computer-readable storage media of claim 16, wherein the transition replaces the displayed portion of machine data in the cell in the list of the plurality of the events with the field values and field names of the fields associated with the first event.

18. The one or more computer-readable storage media of claim 16, wherein the list format displays, for each event, respective field values of selected fields of the event proximate to the portion of machine data of the event.

19. The one or more computer-readable storage media of claim 16, wherein the table format displays columns corresponding to fields of the one or more of the events and respective field values of the plurality of fields in rows.

20. The one or more computer-readable storage media of claim 16, wherein the first display format displays each event without identifying any field values of fields of the event.

21. The one or more computer-readable storage media of claim 16, wherein the extraction rule comprises a regular expression.

22. The one or more computer-readable storage media of claim 16, wherein the portion of machine data reflects at least one of security-related or information technology management information of the at least one computing system.

23. The one or more computer-readable storage media of claim 16, wherein the portion of machine data comprises a portion of raw machine data.

24. A computer-implemented system comprising: one or more processors; and one or more computer-readable storage media comprising instructions that are stored thereon that, responsive to execution by the one or more processors, cause the one or more processors to perform operations comprising:
receiving, from input to a search screen, a search query on events in a data store, each event comprising a time stamp and a portion of machine data that reflects activity in an information technology environment of at least one computing system and is associated with one or more fields, wherein a field is defined by an extraction rule for extracting a subportion of text from the portion of machine data in an event by identifying a pattern in the portion of machine data to produce a field value and a field name for the field for the event;
causing display in the search screen of a search results set that is responsive to the receiving of the search query using a raw view of one or more events of a plurality of the events of the search results set in a first display format that displays for at least a first event of the one or more events, the portion of machine data of the first event in a cell, the displayed portion of machine data corresponding to a plurality of field values of the fields of the first event without displaying field names in the cell, wherein the raw view comprises a list of the plurality of the events;

causing display of a graphical display element, that when selected, causes display of the search results set using an alternate view of the one or more events in a second display format, the second display format being a list format or a table format; and causing a transition in the displayed list in the search screen from the display of the search results set using the raw view of the one or more events in the first display format to the display of the search results set using the alternate view of the one or more events in the second display format based on a user selection of the graphical display element, wherein the transition causes display of the field values and field names of the fields associated with the first event produced using the extraction rule in the cell in the list of the plurality of the events.

25. The system of claim 24, wherein the transition replaces the displayed portion of machine data in the cell in the list of the plurality of the events with the field values and field names of the fields associated with the first event.

26. The system of claim 24, wherein the list format displays, for each event, respective field values of selected fields of the event proximate to the portion of machine data of the event.

27. The system of claim 24, wherein the table format displays columns corresponding to fields of the one or more of the events and respective field values of the plurality of fields in rows.

28. The system of claim 24, wherein the first display format displays each event without identifying any field values of fields of the event.

29. The system of claim 24, wherein the extraction rule comprises a regular expression.

30. The system of claim 24, wherein the portion of machine data reflects at least one of security-related or information technology management information of the at least one computing system.

* * * * *